United States Patent
Kim et al.

(10) Patent No.: US 12,081,370 B2
(45) Date of Patent: Sep. 3, 2024

(54) METHOD AND DEVICE FOR TRANSMITTING UPLINK CHANNEL IN WIRELESS COMMUNICATION SYSTEM

(71) Applicant: Samsung Electronics Co., Ltd., Gyeonggi-do (KR)

(72) Inventors: Youngbum Kim, Gyeonggi-do (KR); Jinkyu Kang, Gyeonggi-do (KR); Taehyoung Kim, Gyeonggi-do (KR); Sungjin Park, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 128 days.

(21) Appl. No.: 17/792,251

(22) PCT Filed: Dec. 31, 2020

(86) PCT No.: PCT/KR2020/019471
§ 371 (c)(1),
(2) Date: Jul. 12, 2022

(87) PCT Pub. No.: WO2021/149940
PCT Pub. Date: Jul. 29, 2021

(65) Prior Publication Data
US 2023/0048695 A1    Feb. 16, 2023

(30) Foreign Application Priority Data
Jan. 23, 2020    (KR) .................. 10-2020-0009313

(51) Int. Cl.
*H04L 25/02*    (2006.01)
*H04L 1/08*    (2006.01)
(Continued)

(52) U.S. Cl.
CPC ............ *H04L 25/0228* (2013.01); *H04L 1/08* (2013.01); *H04L 5/0012* (2013.01); *H04L 5/0082* (2013.01); *H04L 5/1469* (2013.01)

(58) Field of Classification Search
CPC ..... H04L 25/0228; H04L 1/08; H04L 5/0012; H04L 5/0082; H04L 5/1469
See application file for complete search history.

(56) References Cited

U.S. PATENT DOCUMENTS

| | | | |
|---|---|---|---|
| 10,312,962 | B2 | 6/2019 | Ro et al. |
| 2018/0035424 | A1 | 2/2018 | Sun et al. |

(Continued)

FOREIGN PATENT DOCUMENTS

| | | |
|---|---|---|
| KR | 10-1534169 | 7/2015 |
| KR | 1020180127249 | 11/2018 |

(Continued)

OTHER PUBLICATIONS

Panasonic, "On PUSCH Enhancements for NR URLLC", R1-1813133, 3GPP TSG RAN WG1 Meeting #95, Nov. 12-16, 2018, 4 pages.

(Continued)

*Primary Examiner* — Chae S Lee
(74) *Attorney, Agent, or Firm* — The Farrell Law Firm, P.C.

(57) ABSTRACT

According to an embodiment of the disclosure, a method of operating a user equipment (UE) for estimating a channel based on a physical uplink shared channel (PUSCH) transmitted repetitively may include receiving, from a base station (BS), repetitive transmission configuration information for repetitively transmitting a PUSCH; receiving, from the BS, frequency hopping configuration information including configuration information for a hopping interval between a plurality of frequency resources for transmitting the PUSCH; and repetitively transmitting the PUSCH to the (Continued)

BS while performing frequency hopping at the hopping interval based on the repetitive transmission configuration information and the frequency hopping configuration information.

20 Claims, 20 Drawing Sheets

(51) Int. Cl.
  *H04L 5/00* (2006.01)
  *H04L 5/14* (2006.01)

(56) References Cited

U.S. PATENT DOCUMENTS

| | | | |
|---|---|---|---|
| 2018/0115344 A1* | 4/2018 | Xue | ............... H04W 4/70 |
| 2019/0053211 A1 | 2/2019 | Ying et al. | |
| 2019/0341962 A1 | 11/2019 | Yi | |
| 2021/0014879 A1 | 1/2021 | Bae et al. | |
| 2021/0194556 A1* | 6/2021 | Ly | ............... H04L 5/0094 |
| 2022/0104224 A1* | 3/2022 | Choi | ............... H04L 5/0094 |
| 2023/0239089 A1* | 7/2023 | Choi | ............... H04L 1/0009 |
| | | | 370/330 |

FOREIGN PATENT DOCUMENTS

| | | |
|---|---|---|
| WO | WO 2019/156505 | 8/2019 |
| WO | WO-2020067967 A1 * | 4/2020 ........... H04L 5/0012 |

OTHER PUBLICATIONS

Nokia, "Introduction of NR URLLC Support", R1-1913650, 3GPP TSG-RAN WG1 Meeting #99, Nov. 18-22, 2019, 51 pages.
European Search Report dated Dec. 8, 2022 issued in counterpart application No. 20916009.2-1206, 9 pages.
Panasonic, "On PUSCH Enhancements for NR URLLC", R1-1912749, 3GPP TSG RAN WG1 Meeting#99, Nov. 18-22, 2019, 12 pages.
International Search Report dated Apr. 9, 2021 Issued in counterpart application No. PCT/KR2020/019471, 15 pages.
Korean Office Action dated Dec. 4, 2023 issued in counterpart application No. 10-2020-0009313, 14 pages.

* cited by examiner

FIG. 3

(301)
One symbol pattern

| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |

(302)
Two symbol pattern

| 2/3/6/7 | CDM group1 |
| 0/1 | CDM group0 |
| 2/3/6/7 | CDM group1 |
| 0/1 | CDM group0 |
| 2/3/6/7 | CDM group1 |
| 0/1 | CDM group0 |
| 2/3/6/7 | CDM group1 |
| 0/1 | CDM group0 |
| 2/3/6/7 | CDM group1 |
| 0/1 | CDM group0 |
| 2/3/6/7 | CDM group1 |
| 0/1 | CDM group0 |

(303)
One symbol pattern

| 4/5 | CDM group2 |
| 4/5 | |
| 2/3 | CDM group1 |
| 2/3 | |
| 0/1 | CDM group0 |
| 0/1 | |
| 4/5 | CDM group2 |
| 4/5 | |
| 2/3 | CDM group1 |
| 2/3 | |
| 0/1 | CDM group0 |
| 0/1 | |

(304)
Two symbol pattern

| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |

METHOD AND DEVICE FOR TRANSMITTING UPLINK CHANNEL IN WIRELESS COMMUNICATION SYSTEM

PRIORITY

This application is a National Phase Entry of PCT International Application No. PCT/KR2020/019471, which was filed on Dec. 31, 2020, and claims priority to Korean Patent Application No. 10-2020-0009313, which was filed on Jan. 23, 2020, the entire content of each of which is incorporated herein by reference.

TECHNICAL FIELD

The disclosure provides a method by which a base station or a user equipment configures an uplink channel in a wireless communication system.

BACKGROUND ART

To meet the ever-increasing demand with respect to wireless data traffic since the commercialization of the 4G communication system, there have been efforts to develop an advanced fifth generation (5G) system or pre-5G communication system. For this reason, the 5G or pre-5G communication system is also called a beyond fourth generation (4G) network communication system or post long term evolution (LTE) system. The 5G communication system defined by the third generation partnership project (3GPP) is called a new radio (NR) system. Implementation of the 5G communication system using ultrahigh frequency (millimeter wave (mmWave)) bands, e.g., 60 giga hertz (GHz) bands, is being considered to attain higher data transfer rates. To reduce path loss of radio waves and increase a transmission range of radio waves in the ultra-frequency bands, beamforming, massive multiple-input multiple-output (MIMO), full dimensional MIMO (FD-MIMO), array antennas, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, advanced coding modulation (ACMO) schemes, e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart home, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Application of a cloud radio access network (cloud RAN) as the aforementioned big data processing technology may also be an example of convergence of 5G and IoT technologies.

DESCRIPTION OF EMBODIMENTS

Technical Problem

The disclosure provides a method and apparatus for transmitting an uplink channel in a wireless communication system.

Solution to Problem

According to an embodiment of the disclosure, a method of operating a user equipment (UE) for estimating a channel based on a physical uplink shared channel (PUSCH) transmitted repetitively may include receiving, from a base station (BS), repetitive transmission configuration information for repetitively transmitting a PUSCH; receiving, from the BS, frequency hopping configuration information including configuration information for a hopping interval between a plurality of frequency resources for transmitting the PUSCH; and repetitively transmitting the PUSCH to the BS while performing frequency hopping at the hopping interval based on the repetitive transmission configuration information and the frequency hopping configuration information. According to an embodiment of the disclosure, a method of operating a BS for estimating a channel based on a PUSCH transmitted repetitively may include transmitting, to a UE, repetitive transmission configuration information for repetitively transmitting a PUSCH; transmitting, to the UE, frequency hopping configuration information including configuration information for a hopping interval between a plurality of frequency resources for transmitting the PUSCH; repetitively receiving, from the UE, the PUSCH repetitively transmitted while performing frequency hopping at the hopping interval based on the repetitive transmission configuration information and the frequency hopping configuration information; and estimating a channel by simultaneously using at least one of demodulation reference signals (DMRSs) included in the PUSCHs repetitively received.

A BS or UE transmits an uplink channel in various frequency resources through a method of configuring frequency resources of an uplink channel suitable for a transmission environment, which is proposed by the disclosure, thereby making it possible to increase uplink channel reception performance.

BRIEF DESCRIPTION OF DRAWINGS

FIG. 3 is a view for describing a demodulation reference signal (DMRS) pattern (type 1 and type 2) used for communication between a base station (BS) and a user equipment (UE) in a 5G system.

MODE OF DISCLOSURE

Figure 1:
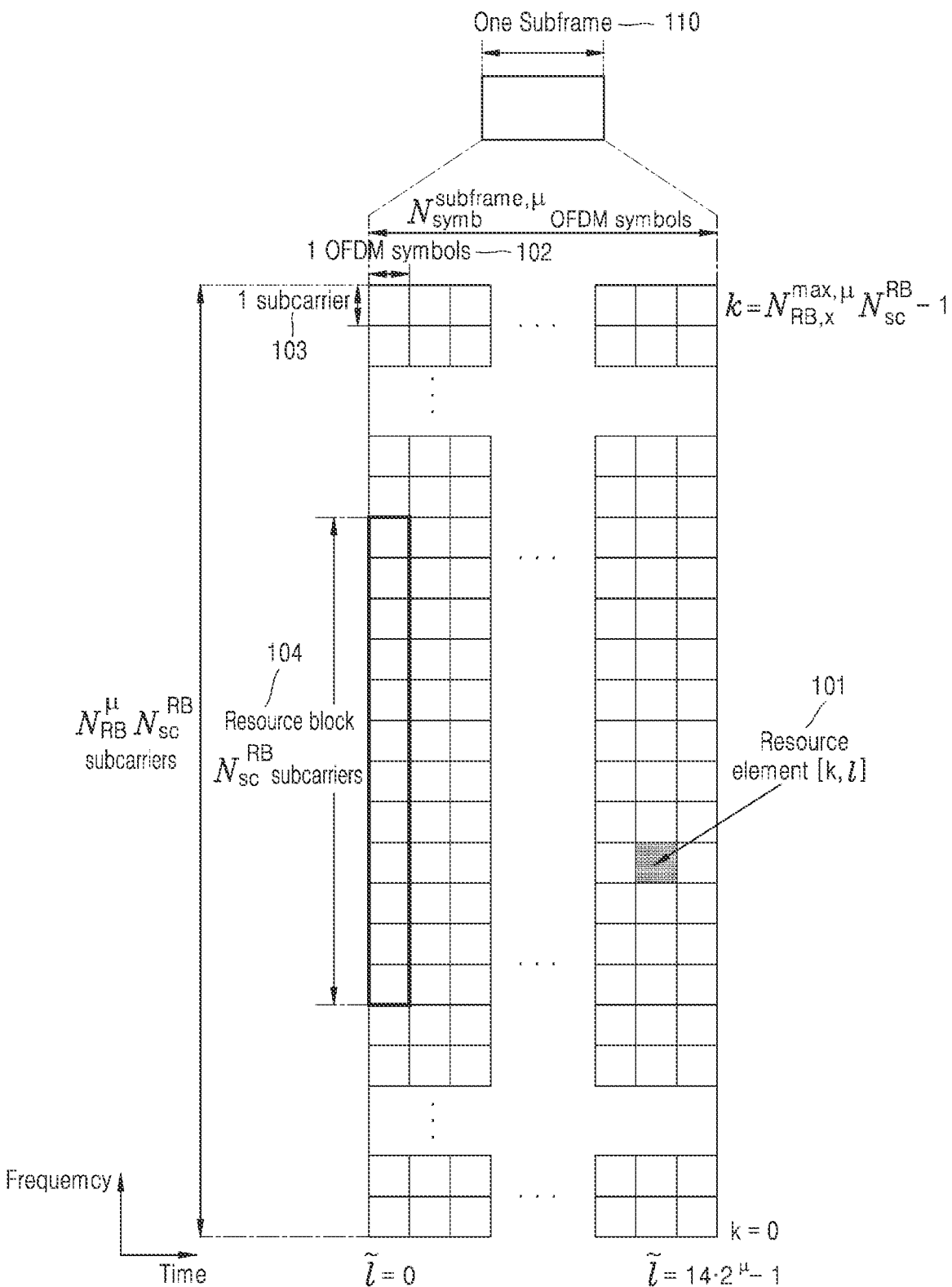
FIG. 1 illustrates a basic structure of a time-frequency domain, which is a radio resource domain in which data or a control channel is transmitted in a fifth generation (5G) system.

Embodiments of the disclosure will be described in detail with reference to accompanying drawings. Technological content well-known in the art or not directly related to the disclosure is omitted in the following description of embodiments of the disclosure. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

In the following description, a base station is an entity for performing resource allocation for a terminal, and may be at least one of a gNB, an eNB, a Node B, a base station (BS), a radio access unit, a base station controller, or a network node. The terminal may include a user equipment (UE), a mobile station (MS), a cellular phone, a smart phone, a computer, or a multimedia system capable of performing a communication function. Herein, downlink (DL) refers to a radio transmission path for a signal transmitted from a BS to a UE, and uplink (UL) refers to a radio transmission path for a signal transmitted from a UE to a BS. Although the following embodiments will focus on the long term evolution (LTE) or LTE-Advanced (LTE-A) system as an example, they may be applied to other communication systems with similar technical backgrounds or channel types. For example, the 5th generation (5G) mobile communication technologies developed since the LTE-A, such as the 5G new radio (NR) may be included in the systems to which the embodiments of the disclosure will be applied, and the term '5G' as herein used may be a concept including the existing LTE, LTE-A, or other similar services. Furthermore, embodiments of the disclosure will also be applied to different communication systems with some modifications to such an extent that does not significantly deviate the scope of the disclosure when judged by skilled people in the art.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment to function in a particular manner, so it is possible to manufacture a product that contains instruction stored in the computer-executable or computer-readable memories for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Embodiments of the disclosure will now be described in detail with reference to the accompanying drawings. A method and apparatus proposed in embodiments of the disclosure will now be described by taking an example for enhancing PUSCH coverage, without being limited thereto, and a combination of all or some of one or more embodiments of the disclosure may be used for a method of configuring a frequency resource corresponding to another channel. Furthermore, the embodiments of the disclosure will also be applied through some modifications to an extent that does not significantly deviate from the scope of the disclosure when judged by those of ordinary skill in the art.

In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

Wireless communication systems are evolving from early systems that provide voice-oriented services to broadband wireless communication systems that provide high data rate and high quality packet data services such as third generation partnership project (3GPP) high speed packet access (HSPA), LTE or evolved universal terrestrial radio access (E-UTRA), LTE-A, LTE-Pro, 3GPP2 high rate packet data (HRPD), ultra-mobile broadband (UMB), and IEEE 802.16e communication standards.

As a representative example of such a broadband wireless communication system, an LTE system adopts orthogonal frequency division multiplexing (OFDM) for DL and single carrier frequency division multiple access (SC-FDMA) for UL. The UL refers to a radio link for a UE or MS to transmit data or a control signal to an eNode B (eNB) or BS, and the DL refers to a radio link for a BS to transmit data or a control signal to a UE or MS. Such a multiple access scheme allocates and operates time-frequency resources for carrying data or control information for respective users not to overlap each other, i.e., to maintain orthogonality, thereby differentiating each user's data or control information.

The 5G communication system that is a communication system since the LTE, needs to support services that simultaneously meet various demands to freely reflect the various demands from users and service providers. The services considered for the 5G communication system may include enhanced mobile broadband (eMBB), massive machine type communication (mMTC), ultra-reliability low latency communication (URLLC), etc.

The eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in light of a single BS. Furthermore, the 5G communication system needs to provide increasing user perceived data rate while providing the peak data rate. To satisfy these requirements, enhancement of various technologies for transmission or reception including multiple-input multiple-output (MIMO) transmission technologies may be required. While the LTE system uses a maximum of 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as the Internet of Things (IoT). In order for the mMTC to provide the IoT efficiently, support for access from massive number of UEs in a cell, enhanced coverage of the terminal, extended battery time, reduction in terminal price, etc., are required. Because the IoT is equipped in various sensors and devices to provide communication functions, it may be supposed to support a large number of UEs in a cell (e.g., 1,000,000 terminals/km$^2$). Furthermore, a UE supporting the mMTC is more likely to be located in a shadow area, such as basement of a building, which might not be covered by a cell by the nature of the service, so the mMTC requires an even larger coverage than expected for other services provided by the 5G communication system. The UE supporting the mMTC needs to be a low-cost UE, and requires quite long battery lifetime such as 10 to 15 years because the battery in the UE is hard to be changed frequently.

Finally, URLLC is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency and very high reliability. For example, URLLC services may need to satisfy sub-millisecond (less than 0.5 millisecond) air interface latency and simultaneously require a packet error rate equal to or lower than $10^{-5}$. Hence, for the URLLC services, the 5G system needs to provide a smaller transmit time interval (TTI) than for other services, and simultaneously needs to allocate a wide range of resources for a frequency band to secure reliability of the communication link.

Those three services of the 5G communication system (hereinafter, interchangeably used with the 5G system), i.e., eMBB, URLLC, and mMTC, may be multiplexed and transmitted from a single system. In this case, to meet different requirements for the three services, different transmission or reception schemes and parameters may be used between the services.

A frame structure in a 5G system will now be described in more detail with reference to the accompanying drawings.

FIG. 1 illustrates a basic structure of time-frequency domain, which is a radio resource domain of a 5G system, according to an embodiment of the disclosure.

In FIG. 1, the horizontal axis represents a time domain, and the vertical axis represents a frequency domain. A basic resource unit in the time and frequency domain is a resource element (RE) 101, which may be defined as an orthogonal frequency division multiplexing (OFDM) symbol or discrete Fourier transform spread OFDM (DFT-s-OFDM) 102 in the time domain and a subcarrier 103 on the frequency domain. In the frequency domain, $N_{sc}^{RB}$ (e.g., 12) consecutive REs may constitute a single resource block (RB) 104. In the time domain, $N_{symb}^{subframe}$ consecutive OFDM symbols may constitute a single subframe 110.

Figure 2:
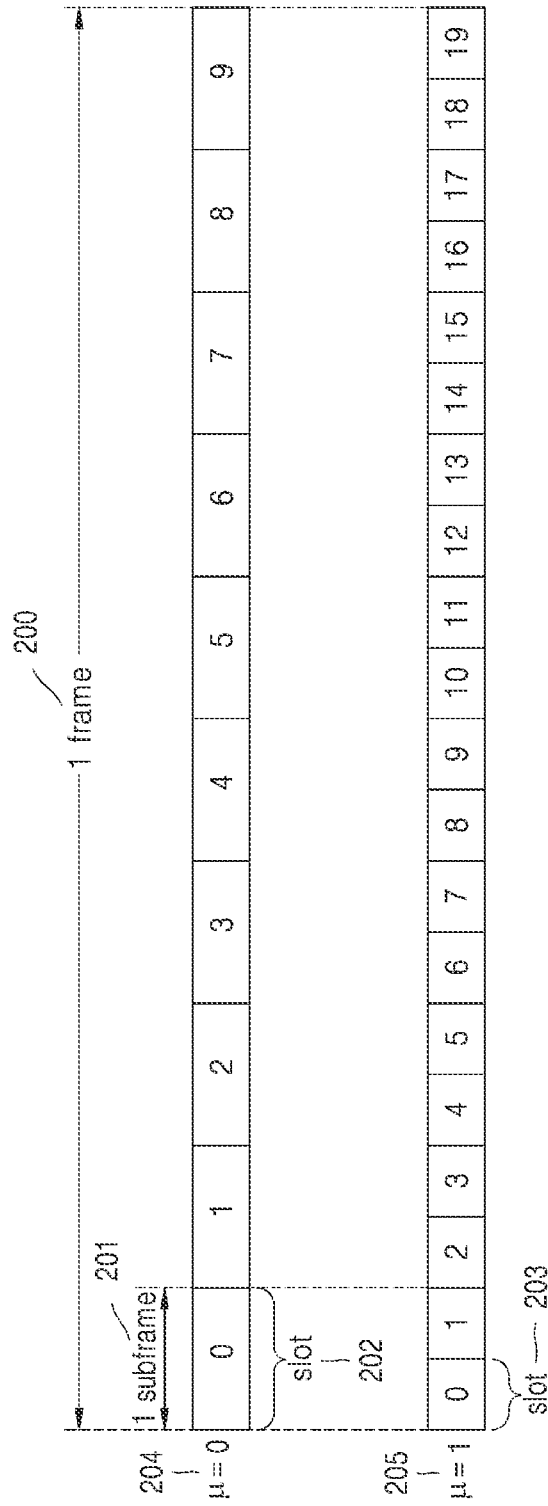
FIG. 2 illustrates a slot structure considered in a 5G system.

FIG. 2 illustrates a slot structure considered in a 5G system.

In FIG. 2, an example of structures of a frame 200, a subframe 201 and a slot 202 is shown. The one frame 200 may be defined to be 10 ms long. The one subframe 201 may be defined to be 1 ms, and thus a total of 10 subframes 201 may constitute the one frame 200. The one slot 202 or 203 may be defined to have 14 OFDM symbols (i.e., the number of symbols per 1 slot ($N_{symb}^{slot}$)=14). The one subframe 201 may include one or multiple slots 202 and 203, and the number of slots 202 and 203 per one subframe may vary depending on subcarrier spacing configuration values p 204 and 205.

In the example of FIG. 2, shown are slot structures in cases of the subcarrier spacing configuration values being 0 and 1, i.e., $\mu=0$ (204) and $\mu=1$ (205), respectively. In the case of $\mu=0$ (204), one subframe 201 includes one slot 202, and in the case of $\mu=1$ (205), one subframe 201 includes two slots 203. That is, depending on the subcarrier spacing configuration value p, the number of slots per one subframe ($N_{slot}^{subframe,\mu}$) may vary and the number of slots per one frame ($N_{slot}^{frame,\mu}$) may vary accordingly. $N_{slot}^{subframe,\mu}$ and slot depending on the subcarrier spacing configuration value $\mu$ may be defined as in Table 1 below.

TABLE 1

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

A demodulation reference signal (DMRS), one of reference signals in the 5G system will now be described in detail.

The DMRS as will be described below refers to a reference signal having characteristics of being subject to UE-specific precoding and transmitted for the UE to be able to perform demodulation without receiving additional precoding information. The DMRS may include several DMRS ports, which use code division multiplexing (CDM) or frequency division multiplexing (FDM) to maintain orthogonality for preventing mutual interference. The term DMRS, however, may be expressed by other names based on a user's intention and a purpose to use the reference signal. Specifically, the term DMRS is merely an example to explain the disclosure more lucidly and help to understand the disclosure, without being limited thereto. Thus, it will be apparent to those of ordinary skill in the art that the disclosure is also applied to other reference signals based on the technical idea of the disclosure.

FIG. 3 is a view for describing a DMRS pattern (type 1 and type 2) used for communication between a BS and a UE in a 5G system.

In the 5G system, two DMRS patterns are supported. The two DMRS patterns are shown in detail in FIG. 3. Referring to FIG. 3, reference numerals 301 and 302 indicate DMRS type 1, wherein 301 indicates a one-symbol pattern and 302 indicates a two-symbol pattern. In FIG. 3, DMRS type 1 301 and 302 is a DMRS pattern in comb 2 structure, which may be comprised of two code division modulation (CDM) groups, and the different CDM groups are frequency-division-modulated (FDMed). Specifically, in 301 and 302 of FIG. 3, horizontally striped sections indicate CDM group0 and vertically striped sections indicate CDM group1.

In the one-symbol pattern of 301 of FIG. 3, two DMRS ports may be differentiated by applying CDM on the frequency to the same CDM group, and accordingly, a total of 4 orthogonal DMRS ports may be configured. In 301 of FIG. 3, a DMRS port ID mapped to each CDM group is shown (for the DL, the DMRS port ID is represented by adding +1000 to the number shown). In the two-symbol pattern of 302 of FIG. 3, four DMRS ports may be differentiated by applying CDM on the time/frequency to the same CDM group, and accordingly, a total of 8 orthogonal DMRS ports may be configured. In 302, a DMRS port ID mapped to each CDM group is shown (for the DL, the DMRS port ID is represented by adding +1000 to the number shown).

On the other hand, DMRS type 2 in 303 and 304 of FIG. 3 is a DMRS pattern of a structure in which frequency domain orthogonal cover codes (FD-OCCs) are applied to neighboring subcarriers on the frequency, which may be comprised of three CDM groups, and the different CDM groups are FDMed. Specifically, referring to FIG. 3, in 303 and 304, plaided sections indicate CDM group0, horizontally striped sections indicate CDM group1, and vertically striped sections indicate CDM group2.

In the one-symbol pattern of 303 of FIG. 3, two DMRS ports may be differentiated by applying CDM on the frequency to the same CDM group, and accordingly, a total of 6 orthogonal DMRS ports may be configured. In 303 of FIG. 3, a DMRS port ID mapped to each CDM group is shown (for the DL, the DMRS port ID is represented by adding +1000 to the number shown). In the two-symbol pattern of 304 of FIG. 3, four DMRS ports may be differentiated by applying CDM on the time/frequency to the same CDM group, and accordingly, a total of 12 orthogonal DMRS ports may be configured. In 304 of FIG. 3, a DMRS port ID mapped to each CDM group is shown (for the DL, the DMRS port ID is represented by adding +1000 to the number shown).

As described above, in an NR system, two different DMRS patterns (301 and 302 or 303 and 304 of FIG. 3) may be configured, and whether a DMRS pattern is the one-symbol pattern (301 and 303) or neighboring two-symbol patterns (302 and 304) may also be configured. Furthermore, in the NR system, not only the DMRS port numbers are scheduled but also the number of CDM groups also scheduled for PDSCH rate matching is set and signaled. Moreover, in a case of cyclic prefix based orthogonal frequency division multiplexing (CP-OFDM), the aforementioned two DMRS patterns may all be supported for DL and UL, and in a case of discrete Fourier transform spread OFDM (DFT-S-OFDM), only the DMRS type1 of the aforementioned DMRS patterns may be supported for UL. In addition, an additional DMRS may be supported to be configurable. A front-loaded DMRS refers to a first DMRS that comes in the foremost symbol in time, and additional DMRSs refer to DMRSs that come in symbols after the front-loaded DMRS. In the NR system, the number of additional DMRSs may be set to a minimum of 0 to a maximum of 3. Furthermore, in configuring the additional DMRSs, the same pattern with the front-loaded DMRS is assumed. Specifically, for the front-loaded DMRS, when information about whether the aforementioned DMRS pattern type is type 1 or type 2, information about whether the DMRS pattern is the one-symbol pattern or the neighboring two-symbol pattern, and information about the number of CDM groups used with DMRS ports are indicated, DMRS information may be configured such that additional DMRS, when additionally configured, is equal to the front-loaded DMRS.

More specifically, the aforementioned DL DMRS and UL DMRS configurations may be configured through RRC signaling of Table 2 and Table 3 below.

TABLE 2

```
DMRS-DownlinkConfig ::=    SEQUENCE {
  dmrs-Type (DMRS type configuration)
ENUMERATED {type2}    OPTIONAL,    -- Need S
  dmrs-AdditionalPosition (additional DMRS OFDM symbol
configuration)         ENUMERATED {pos0, pos1, pos3}
OPTIONAL,    -- Need S
  maxLength (1 symbol or 2symbol DMRS pattern related
configuration)         ENUMERATED {len2}    OPTIONAL,    -- Need S
    scramblingID0 (scrambling ID0)          INTEGER
(0..65535)    OPTIONAL,    -- Need S
    scramblingID1 (scrambling ID1)          INTEGER
(0..65535)    OPTIONAL,    -- Need S
    phaseTrackingRS (PTRS configuration)     SetupRelease
{ PTRS-DownlinkConfig } OPTIONAL,    -- Need M
  ...
}
```

TABLE 3

```
DMRS-UplinkConfig ::=    SEQUENCE {
  dmrs-Type (DMRS type configuration)
ENUMERATED {type2}
OPTIONAL,    -- Need S
  dmrs-AdditionalPosition (additional DMRS OFDM symbol
configuration)         ENUMERATED {pos0, pos1, pos3}
OPTIONAL,    -- Need R
  phaseTrackingRS   (PTRS configuration)
SetupRelease { PTRS-UplinkConfig }
OPTIONAL,    -- Need M
  maxLength (1 symbol or 2symbol DMRS pattern related
configuration)              ENUMERATED {len2}
OPTIONAL,    -- Need S
    transformPrecodingDisabled              SEQUENCE {
      scramblingID0 (scrambling ID0)         INTEGER
(0..65535)    OPTIONAL,    -- Need S
      scramblingID1 (scrambling ID0)         INTEGER
(0..65535)    OPTIONAL,    -- Need S
    ...
  }
```

TABLE 3-continued

```
OPTIONAL,    -- Need R
    transformPrecodingEnabled              SEQUENCE {
      nPUSCH-Identity (cell ID for DFT-s-OFDM)
INTEGER(0..1007)
OPTIONAL,    -- Need S
      sequenceGroupHopping (sequence group hopping)
ENUMERATED {disabled} OPTIONAL,    -- Need S
      sequenceHopping (sequence hopping)       ENUMERATED
{enabled}       OPTIONAL,    -- Need S
    ...
  }
OPTIONAL,    -- Need R
  ...
}
```

Figure 4:
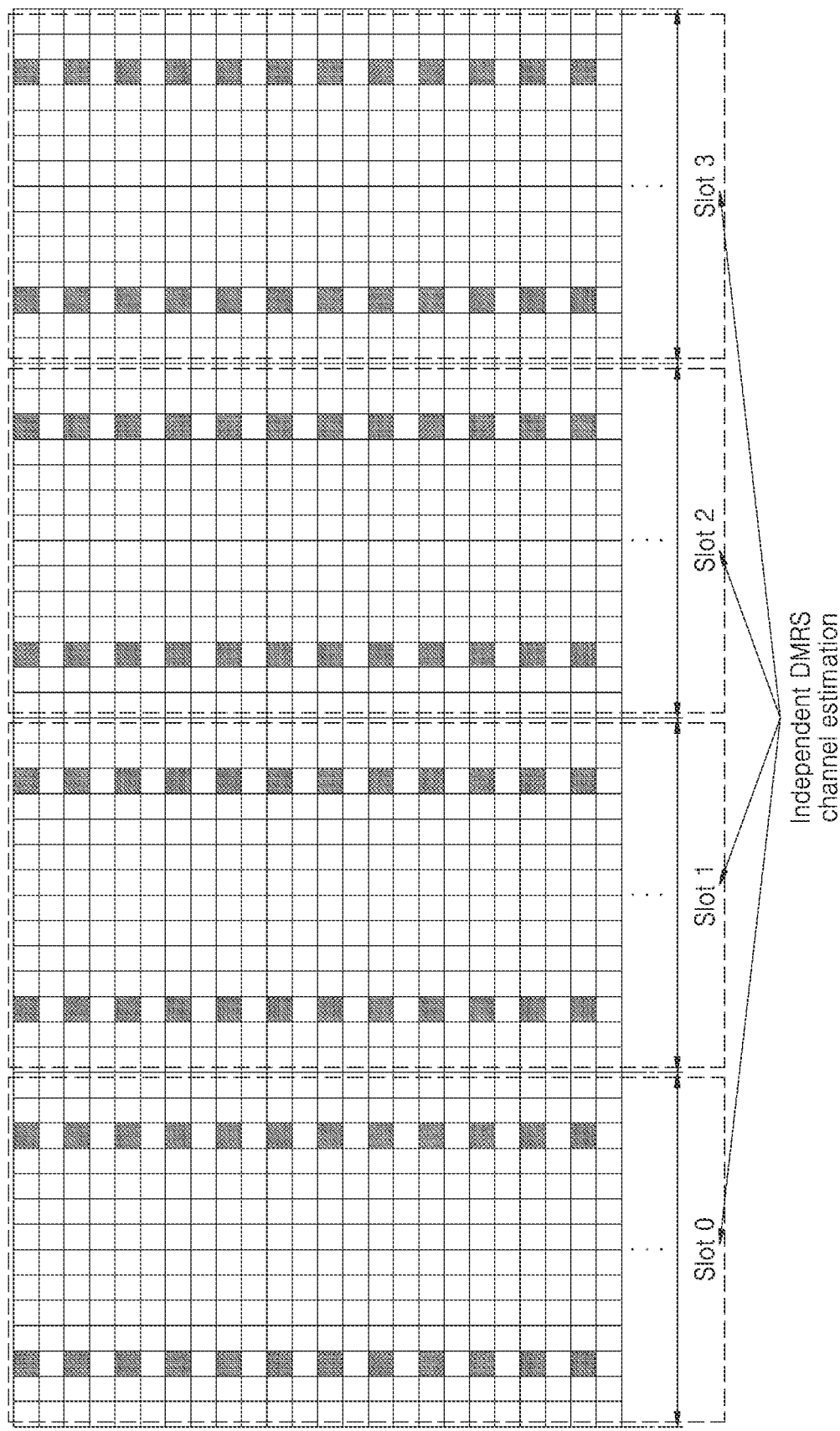
FIG. 4 illustrates an example of channel estimation using a DMRS received in one physical uplink shared channel (PUSCH) in the time domain in a 5G system.

FIG. 4 illustrates an example of channel estimation using a DMRS received in one physical uplink shared channel (PUSCH) in the time domain in a 5G system.

For channel estimation for data decoding by using the aforementioned DMRS, PRB bundling associated with the system domain may be used in the frequency domain to perform channel estimation in a precoding resource block group (PRG), which is the bundling unit. Furthermore, in the time unit, a channel is estimated by assuming that only a DMRS received in only one PUSCH has the same precoding. Hence, channel estimation in the time domain is limited.

Figure 5:
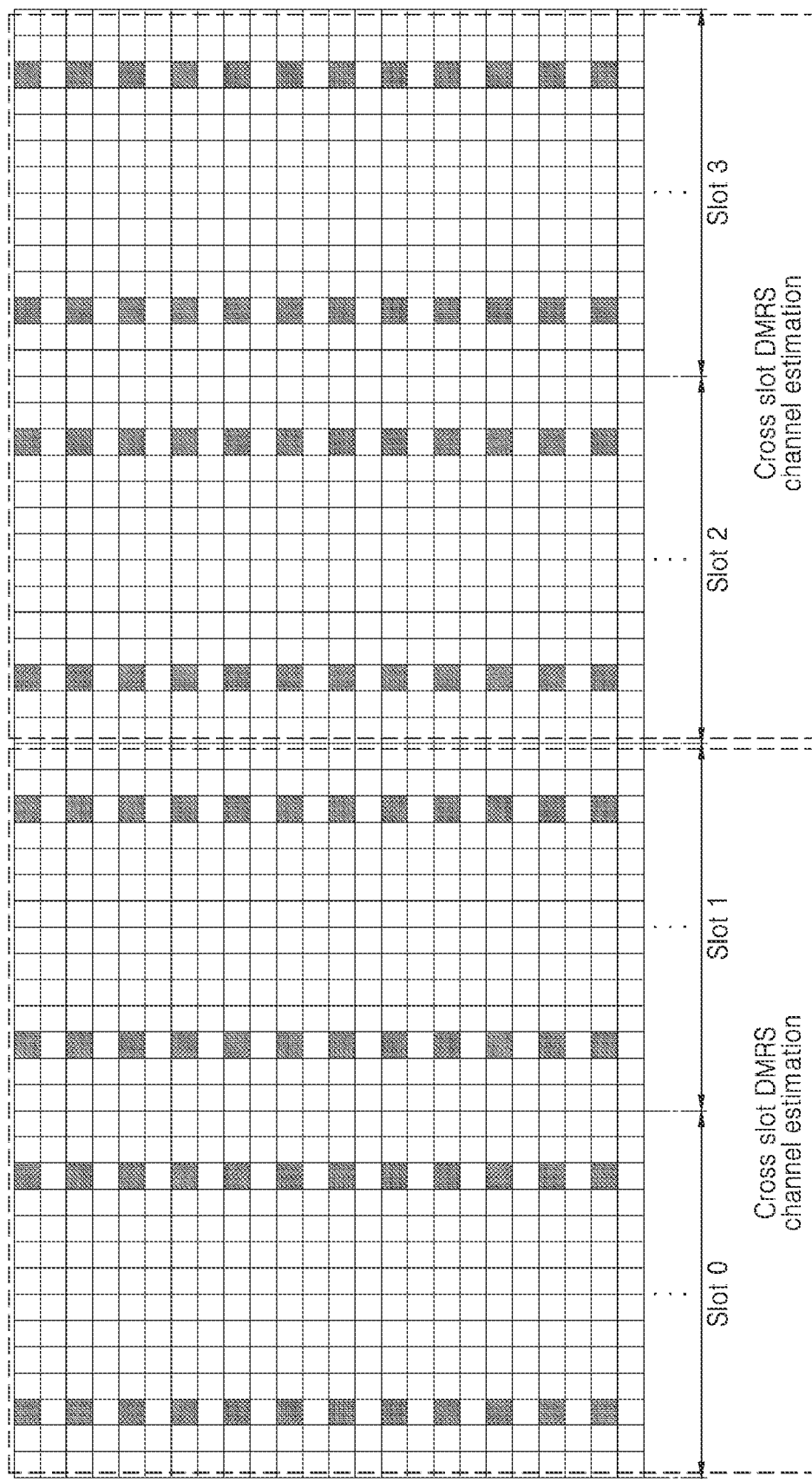
FIG. 5 illustrates an example of channel estimation using DMRSs received in a plurality of PUSCHs in the time domain in a 5G system.

FIG. 5 illustrates an example of channel estimation using DMRSs received in a plurality of PUSCHs in the time domain in a 5G system.

The BS may indicate through a configuration whether the UE is to use the same precoding, and using the indication, the BS may estimate a channel by co-using DMRS transmissions for which the same precoding is used, thereby increasing DMRS channel estimation performance. As in in FIG. 4, for channel estimation for data decoding by using the aforementioned DMRS even in FIG. 5, PRB bundling associated with the system domain may be used in the frequency domain to perform channel estimation in a PRG, which is the bundling unit. In addition, in the time unit, a channel is estimated by assuming that only DMRSs received in one or more PUSCHs have the same precoding. This may improve channel estimation performance because it is possible to estimate a channel based on various DMRSs in the time domain. To improve coverage in particular, channel estimation performance may be very crucial because the channel estimation performance may be a bottleneck even with good data decoding performance.

A time domain resource allocation method for a data channel in the 5G communication will now be described.

The BS may configure the UE with a table of time domain resource allocation information for a DL data channel (physical downlink shared channel, PDSCH) and a UL data channel (physical uplink shared channel, PUSCH) by higher layer signaling (e.g., RRC signaling).

For the PDSCH, the BS may configure a table including up to 16 (maxNrofDL-Allocations=16) entries, and for the PUSCH, a table including up to 16 (maxNrofUL-Allocations=16) entries. The time domain resource allocation information may include, for example, PDCCH-to-PDSCH slot timing (corresponding to a time interval in slots between PDCCH reception time and PDSCH transmission time scheduled on the received PDCCH, and denoted as K0), PDCCH-to-PUSCH slot timing (corresponding to a time interval in slots between PDCCH reception time and PUSCH transmission time scheduled on the received PDCCH, and denoted as K2), information about length and location of a start symbol scheduled on the PDSCH or the PUSCH in the slot, a mapping type of the PDSCH or PUSCH, etc. For example, information as in the following table may be notified to the UE from the BS.

TABLE 4

PDSCH-TimeDomainResourceAllocationList information element

PDSCH-TimeDomainResourceAllocationList  ::=  SEQUENCE (SIZE(1..maxNrofDL-Allocations) )  OF  PDSCH-TimeDomainResourceAllocation
PDSCH-TimeDomainResourceAllocation : : = SEQUENCE {
  k0  INTEGER(0 . . 32)
OPTIONAL,  -- Need S
  (PDCCH-to-PDSCH timing, slot basis)
  mappingType  ENUMERATED {typeA, typeB},
  (PDSCH mapping type)
  startSymbolAndLength  INTEGER (0..127)
  (start symbol and length of PDSCH)
}

TABLE 5

PUSCH-TimeDomainResourceAllocation information element

PUSCH-TimeDomainResourceAllocationList ::=  SEQUENCE (SIZE (1..maxNrofUL-Allocations))  OF  PUSCH-TimeDomainResourceAllocation
PUSCH-TimeDomainResourceAllocation : : = SEQUENCE {
  k2  INTEGER(0 . . 32)
OPTIONAL,  -- Need S
  (PDCCH-to-PUSCH timing, slot basis)
  mappingType  ENUMERATED {typeA, typeB},
  (PUSCH mapping type)
  startPosition  INTEGER (0..127),
  (start symbol and length of PUSCH)
}

The BS may notify the UE of one of the entries of the table about the time domain resource allocation information by L1 signaling (e.g., in DCI, especially in a 'time domain resource allocation' field in the DCI). The UE may obtain the time domain resource allocation information for the PDSCH or the PUSCH based on the DCI received from the BS.

Repetitive transmission on a UL data channel (e.g., PUSCH) in the 5G system will now be described in detail.

In 5G, two types of UL data channel repetitive transmission methods, i.e., PUSCH repetitive transmission type A and PUSCH repetitive transmission type B are supported.

PUSCH Repetitive Transmission Type a
  as described above, a start symbol and length of a UL data channel may be determined in a slot in a time domain resource allocation method, and the BS may notify the UE of the number of repetitive transmissions by higher layer signaling (e.g., RRC signaling) or L1 signaling (e.g., DCI).
  the UE repetitively transmits a UL data channel having the same start symbol and length as the configured UL data channel in successive slots based on the number of repetitive transmissions received from the BS. In this case, when a slot configured as DL by the BS for the UE or at least one of UL data channel symbols configured for the UE is set to DL, the UE skips UL data channel transmission. In other words, the UE counts the number of UL data channel repetitive transmissions but does not perform transmission.
PUSCH Repetitive Transmission Type B
  as described above, a start symbol and length of a UL data channel may be determined in a slot in the time domain resource allocation method, and the BS may notify the UE of the number of repetitive transmissions numberofrepetitions by higher layer signaling (e.g., RRC signaling) or L1 signaling (e.g., DCI).
  based on the start symbol and length of the UL data channel configured earlier, nominal repetition of the UL data channel is determined as follows: A slot in which n-th nominal repetition starts is given by $$K_s + \left\lfloor \frac{S + n \cdot L}{N_{symb}^{slot}} \right\rfloor,$$

and a start symbol in the slot is given by $\mod(S+(n+1)\cdot L-1, N_{symb}^{slot})$. Here, n=0, . . . , numberofrepetitions−1, S denotes a start symbol of the configured UL data channel, and L denotes a symbol length of the configured UL data channel. $K_s$ denotes a slot in which the PUSCH transmission starts, and $N_{symb}^{slot}$ denotes the number of symbols per slot.

the UE determines an invalid symbol for the PUSCH repetitive transmission type B. A symbol set to DL by tdd-UL-DL-ConfigurationCommon or tdd-UL-DL-ConfigurationDedicated is determined as an invalid symbol for the PUSCH repetitive transmission type B. Furthermore, the invalid symbol may be configured in a higher layer parameter (e.g., InvalidSymbolPattern). The higher layer parameter (e.g., InvalidSymbolPattern) may provide a symbol-level bitmap spanning one or two slots to configure invalid symbols. In the bitmap, '1' indicates an invalid symbol. In addition, periodicity and a pattern of the bitmap may be configured in a higher layer parameter (e.g., periodicityAndPattern). When the higher layer parameter (e.g., InvalidSymbolPattern) is configured and parameter InvalidSymbolPatternIndicator-ForDCIFormat0_1 or InvalidSymbolPatternIndicator-ForDCIFormat0_2 represents '1', the UE applies an invalid symbol pattern, and when the parameter represents '0', the UE does not apply the invalid symbol pattern. When the higher layer parameter (e.g., InvalidSymbolPattern) is configured and the parameter InvalidSymbolPatternIndicator-ForDCIFormat0_1 or InvalidSymbolPatternIndicator-ForDCIFormat0_2 is not configured, the UE applies the invalid symbol pattern.

after invalid symbols are determined in each nominal repetition, the UE may consider the remaining symbols as valid symbols. When one or more valid symbols are included in each nominal repetition, one or more actual repetitions may be included for the nominal repetition.

Each of the actual repetitions includes a set of successive valid symbols to be used for the PUSCH repetitive transmission type B in one slot.

Figure 6:
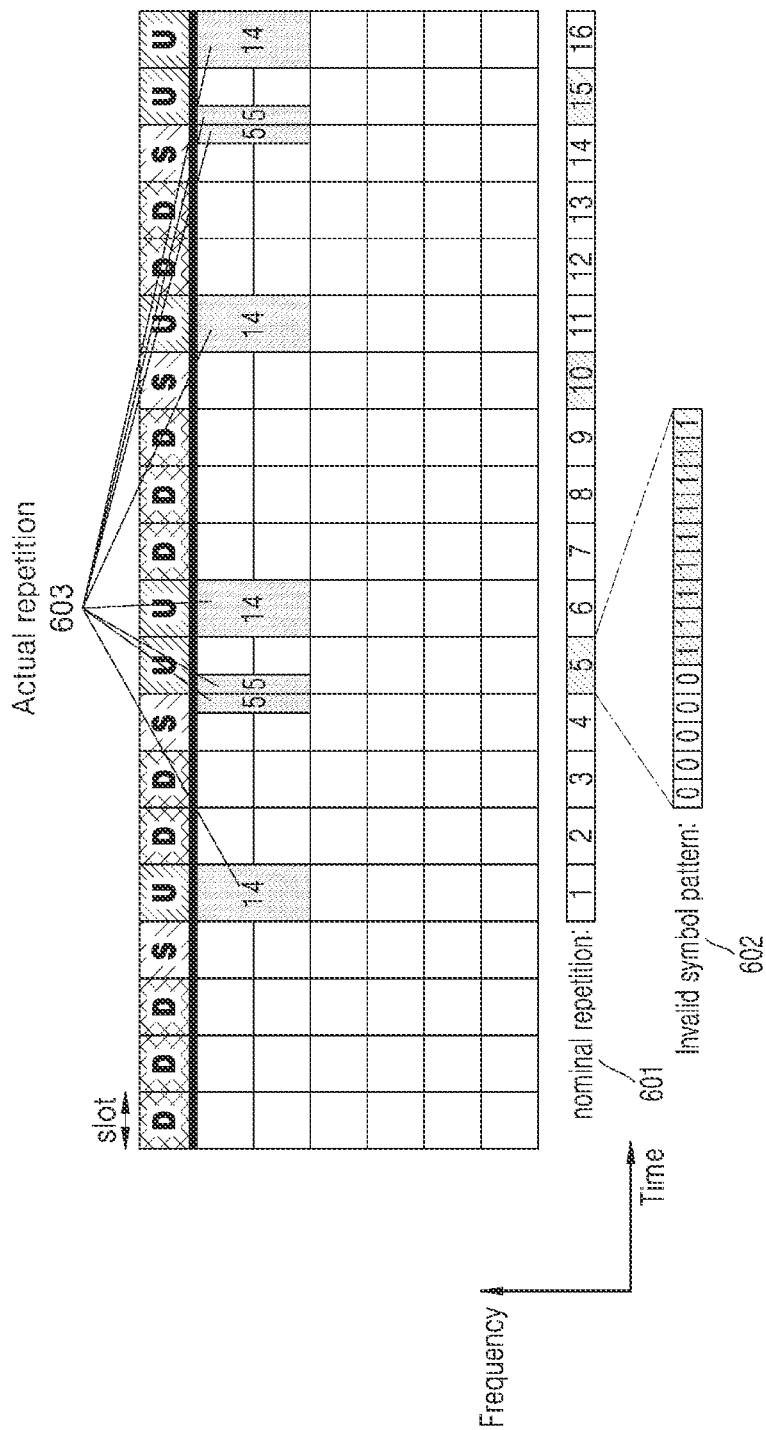
FIG. 6 illustrates an example of PUSCH repetitive transmission type B in a 5G system.

FIG. 6 illustrates an example of PUSCH repetitive transmission type B in a 5G system.

When the UE is configured with start symbol S of a UL data channel as '0' length L of the UL data channel as '14', and the number of repetitive transmissions as '16', nominal repetitions may be performed in 16 successive slots (601). To determine invalid symbols, the UE may determine a symbol set to a DL symbol in each nominal repetition as an invalid symbol, and determine symbols set to 1 in an invalid symbol pattern (602) as invalid symbols. When there are one or more successive valid symbols in a slot other than the invalid symbol(s) in each nominal repetition, the valid symbols may be set to an actual repetition and transmitted (603).

Frequency hopping on a UL data channel (e.g., PUSCH) in the 5G system will now be described in detail.

The 5G supports two methods for each PUSCH repetitive transmission type as the frequency hopping method on a UL data channel. The PUSCH repetitive transmission type A supports intra-slot frequency hopping and inter-slot frequency hopping, and the PUSCH repetitive transmission type B supports inter-repetition frequency hopping and inter-slot frequency hopping.

The intra-slot frequency hopping method supported in the PUSCH repetitive transmission type A is a method by which the UE performs transmission by changing a resource allocated in the frequency domain by a configured frequency offset at two hops in one slot. In the intra-slot frequency hopping, a start RB of each hop is given as $$RB_{start} = \begin{cases} RB_{start} & i = 0 \\ (RB_{start} + RB_{offset}) \bmod N_{BWP}^{size} & i = 1 \end{cases},$$

i=0 and i=1 represent first and second hops, respectively, and $RB_{start}$ represents a start RB in a UL bandwidth part (BWP) and is calculated according to the frequency resource allocation method. $RB_{offset}$ represents a frequency offset between two hops with a higher layer parameter. The number of symbols of the first hop may be represented by $\lfloor N_{symb}^{PUSCH,s}/2 \rfloor$, and the number of symbols of the second hop may be represented by $N_{symb}^{PUSCH,s} - \lfloor N_{symb}^{PUSCH,s}/2 \rfloor$. $N_{symb}^{PUSCH,s}$ is a length of PUSCH transmission in one slot and is represented by the number of OFDM symbols.

The inter-slot frequency hopping method supported in the PUSCH repetitive transmission types A and B is a method by which the UE performs transmission by changing a resource allocated in the frequency domain by a configured frequency offset in each slot. In the intra-slot frequency hopping, a start RB is given as $$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}$$

during $n_s^\mu$ slots. $n_s^\mu$ represents a current slot number in the multi-slot PUSCH transmission, and $RB_{start}$ represents a start RB in a UL BWP and is calculated in the frequency resource allocation method. $RB_{offset}$ represents a frequency offset between two hops with a higher layer parameter.

The inter-repetition frequency hopping method supported in the PUSCH repetitive transmission type B is a method by which the UE performs transmission by changing a resource allocated in the frequency domain by a configured frequency offset in each actual PUSCH.

According to the disclosure, by conducting frequency hopping in consideration of a method by which DMRSs transmitted in a plurality of PUSCHs are simultaneously used to estimate a channel, both the channel estimation performance and channel diversity gain in the frequency domain may be improved, and thus UL reception performance and UL coverage may be improved. The disclosure will now be described through specific embodiments.

First Embodiment

The first embodiment of the disclosure is directed to a frequency hopping method in consideration of a method of estimating a channel by simultaneously using DMRSs transmitted in a plurality of PUSCHs. With the frequency hopping method in consideration of the method of estimating a channel by simultaneously using DMRSs transmitted in a plurality of PUSCHs, a channel diversity gain may be attained in the frequency domain and the channel estimation performance may be improved.

Specifically, the method of estimating a channel by simultaneously using DMRSs transmitted in a plurality of PUSCHs may be used when the DMRSs from the plurality of PUSCHs are transmitted on the same frequency domain resource. Hence, when a channel is estimated by simultaneously using the DMRSs transmitted in the plurality of PUSCHs, it is difficult to attain a channel diversity gain in the frequency domain through frequency hopping. Similarly, in such a case as the existing frequency hopping method available in NR, as hopping is conducted in every repetitive transmission in a slot or in every slot, which causes resources of the frequency domain allocated a plurality of PUSCH transmissions not to be the same, a channel may not be estimated simultaneously based on the DMRSs transmitted in the plurality of PUSCHs.

Accordingly, to attain a channel diversity gain and improve channel estimation performance in the frequency domain, frequency hopping that takes into account a method of estimating a channel by simultaneously using DMRSs transmitted in the plurality of PUSCHs may need to be applied. For this, as a frequency hopping method in consideration of a method of estimating a channel by simultaneously using DMRSs transmitted in the plurality of PUSCHs, the following methods are proposed:

[Method 1]

Figure 7:
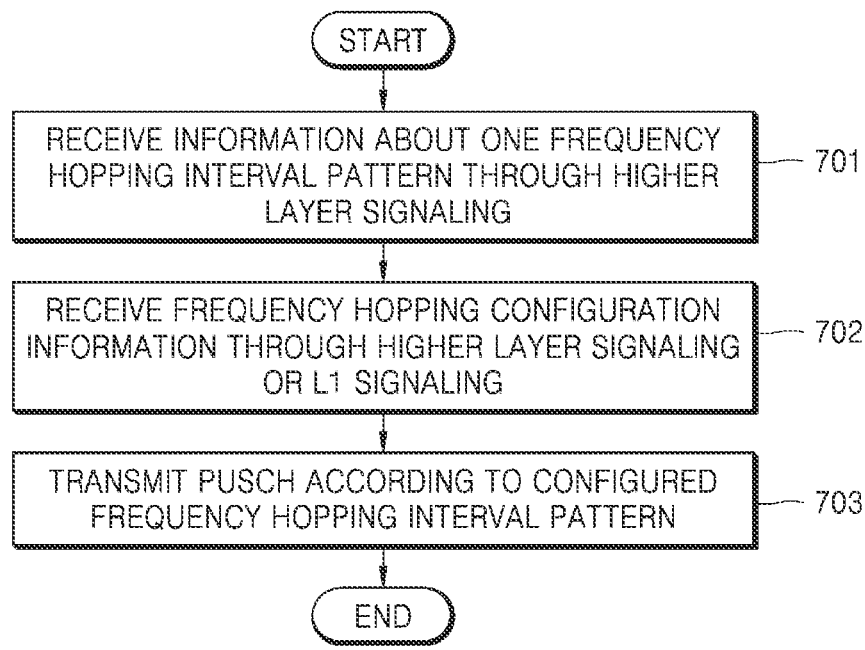
FIG. 7 is a flowchart for describing operation of a UE configured with a frequency hopping interval pattern, according to an embodiment of the disclosure.
Figure 8:
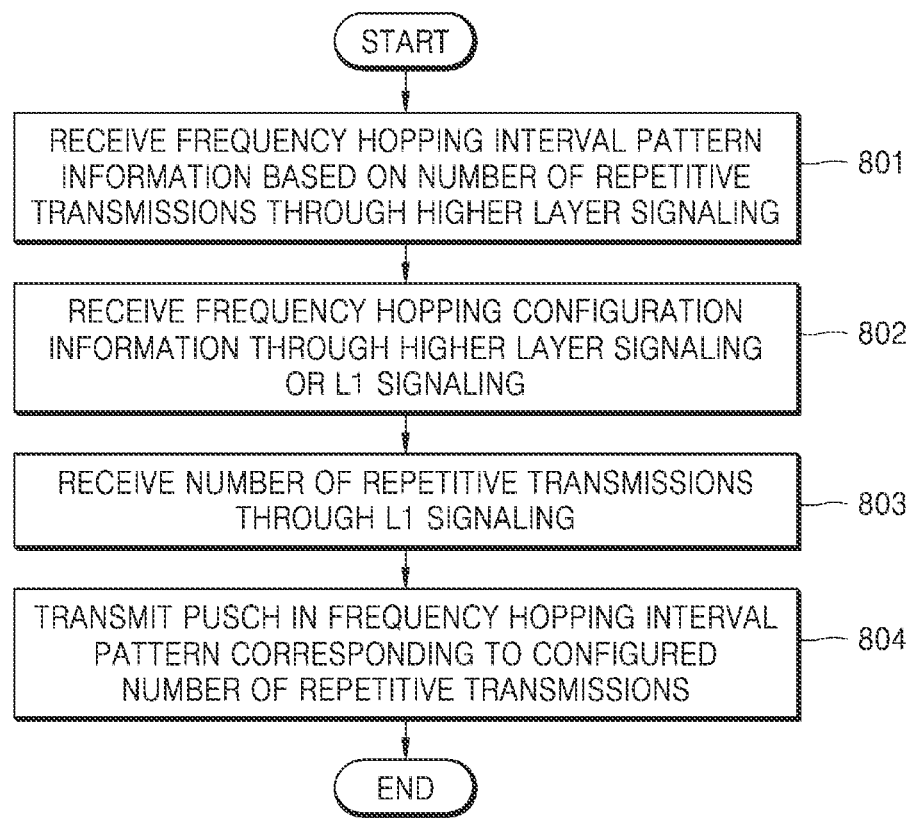
FIG. 8 is a flowchart for describing another operation of a UE configured with a frequency hopping interval pattern, according to an embodiment of the disclosure.
Figure 9:
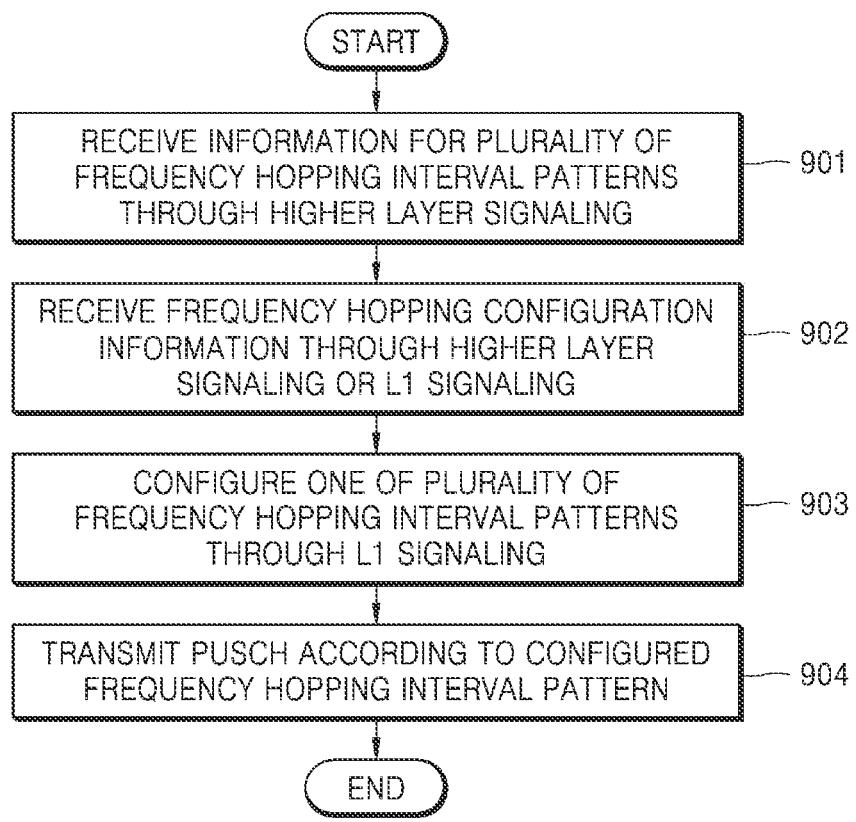
FIG. 9 is a flowchart for describing another operation of a UE configured with a frequency hopping interval pattern, according to an embodiment of the disclosure.

The BS may configure a frequency hopping interval for the UE so as to estimate a channel by simultaneously using DMRSs transmitted in a plurality of PUSCHs. Rules or configurations on the frequency hopping interval will now be called an interval pattern. The BS may configure the UE with the frequency hopping interval through higher layer signaling, L1 signaling, or both of them. As repetitive transmission is skipped in a resource unable to perform UL transmission, the resource unable to perform UL transmission may be dynamically changed in the NR. Hence, with one interval pattern, a suitable frequency hopping pattern may not be configured for estimating a channel by simultaneously using the DMRSs transmitted in the plurality of PUSCHs in a dynamic UL transmission condition. As a method by which the BS configures the UE with a frequency hopping interval, the following methods may be considered:

FIGS. 7, 8 and 9 are flowcharts for describing operation of a UE configured with a frequency hopping interval pattern, according to an embodiment of the disclosure.

Referring to FIG. 7, the UE may be configured by the BS with an interval pattern through higher layer signaling, in operation 701. The UE may receive frequency hopping configuration information from the BS through higher layer signaling or L1 signaling, in operation 702. The UE may transmit a PUSCH to the BS by performing frequency hopping based on the configured interval pattern, in operation 703.

Referring to FIG. 8, the UE may be configured by the BS with an interval pattern based on the number of repetitive transmissions through higher layer signaling, in operation 801. The UE may receive frequency hopping configuration information from the BS through higher layer signaling or L1 signaling, in operation 802. The UE may be configured by the UE with the number of repetitive transmissions through L1 signaling, in operation 803. The UE may transmit a PUSCH to the BS by performing frequency hopping based on an interval pattern corresponding to the configured number of repetitive transmissions, in operation 804.

Referring to FIG. 9, the UE may be configured with a plurality of interval patterns through higher layer signaling, in operation 901. The UE may receive frequency hopping configuration information from the BS through higher layer signaling or L1 signaling, in operation 902. The UE may be configured by the BS with one of the plurality of interval patterns through L1 signaling, in operation 903. The UE may transmit a PUSCH by performing frequency hopping based on the configured frequency hopping interval pattern, in operation 904.

In this way, the UE may be configured with the frequency hopping interval pattern through L1 signaling, may perform frequency hopping and transmit a PUSCH to the BS. As described above, the BS may configure a frequency hopping interval for the UE so as to estimate a channel by simultaneously using DMRSs transmitted in a plurality of PUSCHs while performing frequency hopping. In this case, the frequency hopping interval may be determined in the following methods:

[Method 1-1]

An interval pattern for frequency hopping may be configured on in slots. In the case that the interval pattern for frequency hopping is configured in slots, the UE may transmit a PUSCH by performing frequency hopping without additional determination after receiving the interval pattern information for frequency hopping.

Figure 10:
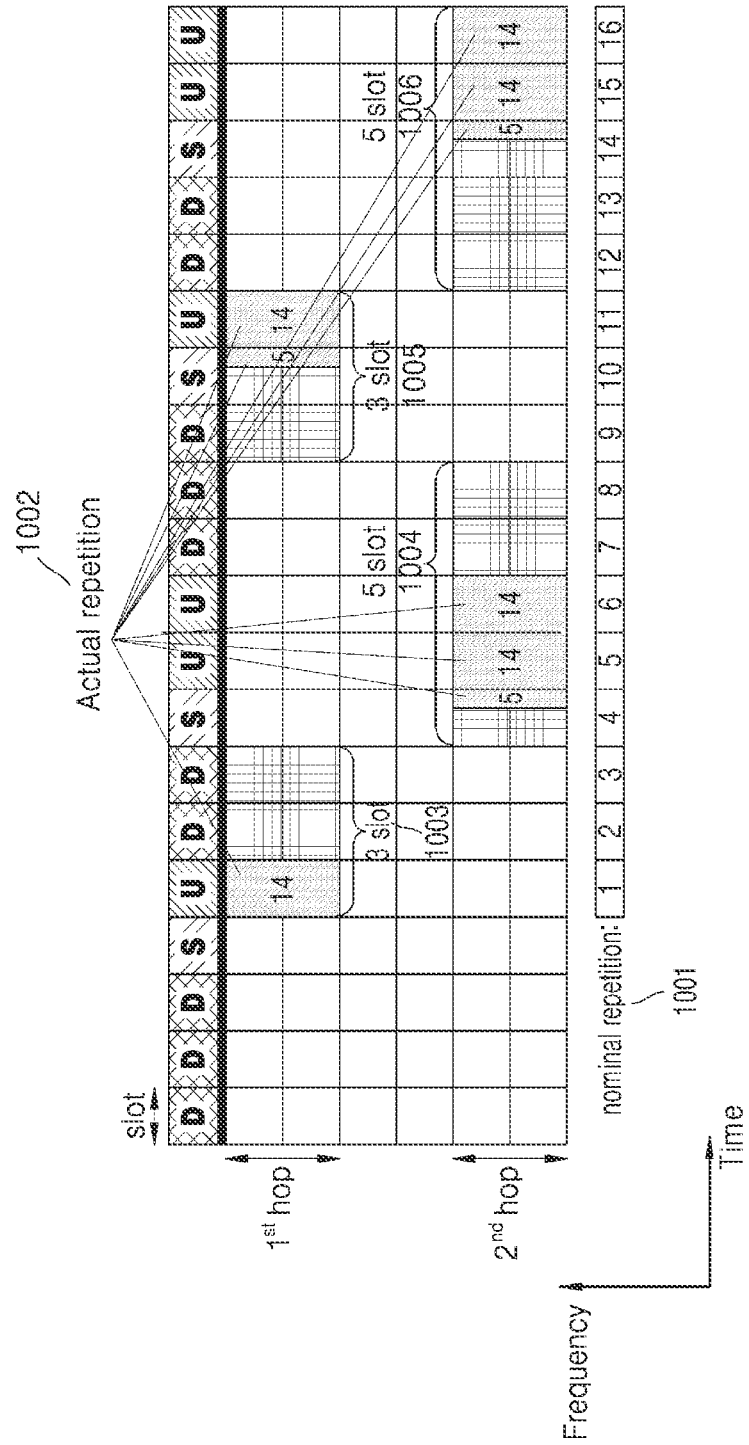
FIG. 10 illustrates a frequency hopping method as an example in a PUSCH repetitive transmission type B, according to an embodiment of the disclosure.

FIG. 10 illustrates a frequency hopping method as an example in a PUSCH repetitive transmission type B, according to an embodiment of the disclosure. Referring to FIG. 10, when the UE is configured with start symbol S of a UL data channel as '0', length L of the UL data channel as '14', and the number of repetitive transmissions as '16', nominal repetitions may be performed in 16 successive slots (1001).

The UE may then determine a symbol set to a DL symbol in each nominal repetition as an invalid symbol in determining invalid symbols. When there are one or more successive valid symbols in a slot other than the invalid symbol(s) in each nominal repetition, the valid symbols may be configured for actual repetitions and a total of 9 actual repetitions may be transmitted (1002).

When the UE is configured with the interval pattern for frequency hopping to be three slots and five slots, the first three slots may be transmitted in a first hop (1003) and next five slots may be transmitted in a second hop (1004), and repeatedly, next three slots may be transmitted back in the first hop (1005) and next five slots may be transmitted back in the second hop (1006). Resources determined as valid symbols in the configured hops may be set to actual repetitions and transmitted. The method 1-1 may be equally applied to the PUSCH repetitive transmission type A.

[Method 1-2]

An interval pattern for frequency hopping may be configured in nominal repetitions. In the case that the interval pattern for frequency hopping is configured in nominal repetitions, the UE may transmit a PUSCH by determining what actual repetition is included in the nominal repetition and performing frequency hopping after receiving the interval pattern information for frequency hopping.

Figure 11:
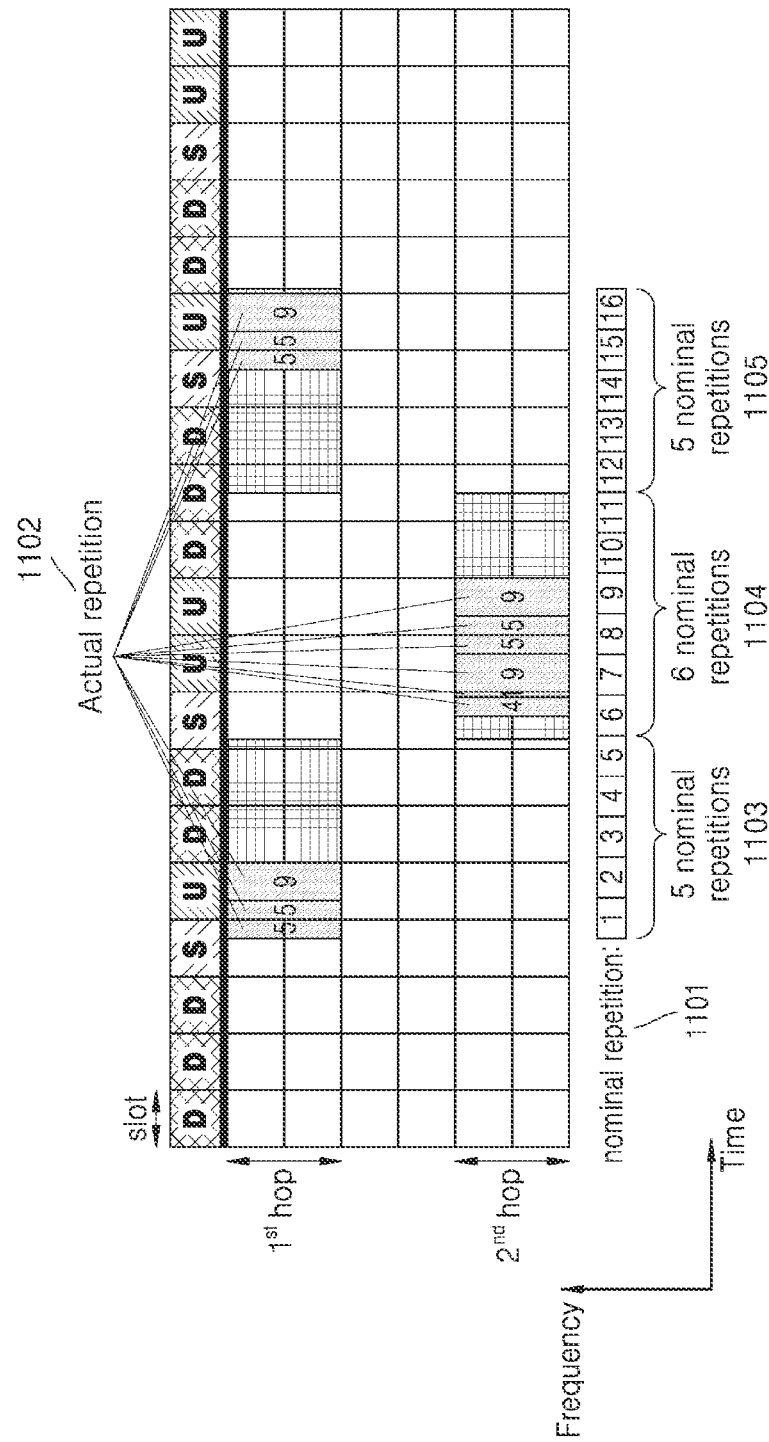
FIG. 11 illustrates a frequency hopping method as another example in a PUSCH repetitive transmission type B, according to an embodiment of the disclosure.

FIG. 11 illustrates a frequency hopping method as another example in a PUSCH repetitive transmission type B, according to an embodiment of the disclosure. Referring to FIG. 11, when the UE is configured with start symbol S of a UL data channel as '9', length L of the UL data channel as '10', and the number of repetitive transmissions as '16', 16 successive nominal repetitions each having 10 OFDM symbols may be performed (1101).

The UE may then determine a symbol set to a DL symbol in each nominal repetition as an invalid symbol in determining invalid symbols. When there are one or more successive valid symbols in a slot other than the invalid symbol(s) in each nominal repetition, the valid symbols may be configured for actual repetitions and a total of 12 actual repetitions may be transmitted (1102).

When the UE is configured with an interval pattern for frequency hopping to be 5 nominal repetitions and 6 nominal repetitions, the UE may transmit actual repetitions included in the first five of the nominal repetitions configured for repetitive transmission in a first hop (1103), transmit actual repetitions included in the next six nominal repetitions in a second hop (1104), and repeatedly transmit actual repetitions included in the next 5 nominal repetitions back in the first hop (1105). Resources determined as valid symbols in the configured hops may be set to actual repetitions and transmitted.

[Method 1-3]

An interval pattern for frequency hopping may be configured in actual repetitions. In the case that the interval pattern for frequency hopping is configured in actual repetitions, the UE may transmit a PUSCH by determining what actual repetition is included in the nominal repetition and performing frequency hopping after receiving the interval pattern information for frequency hopping.

Figure 12:
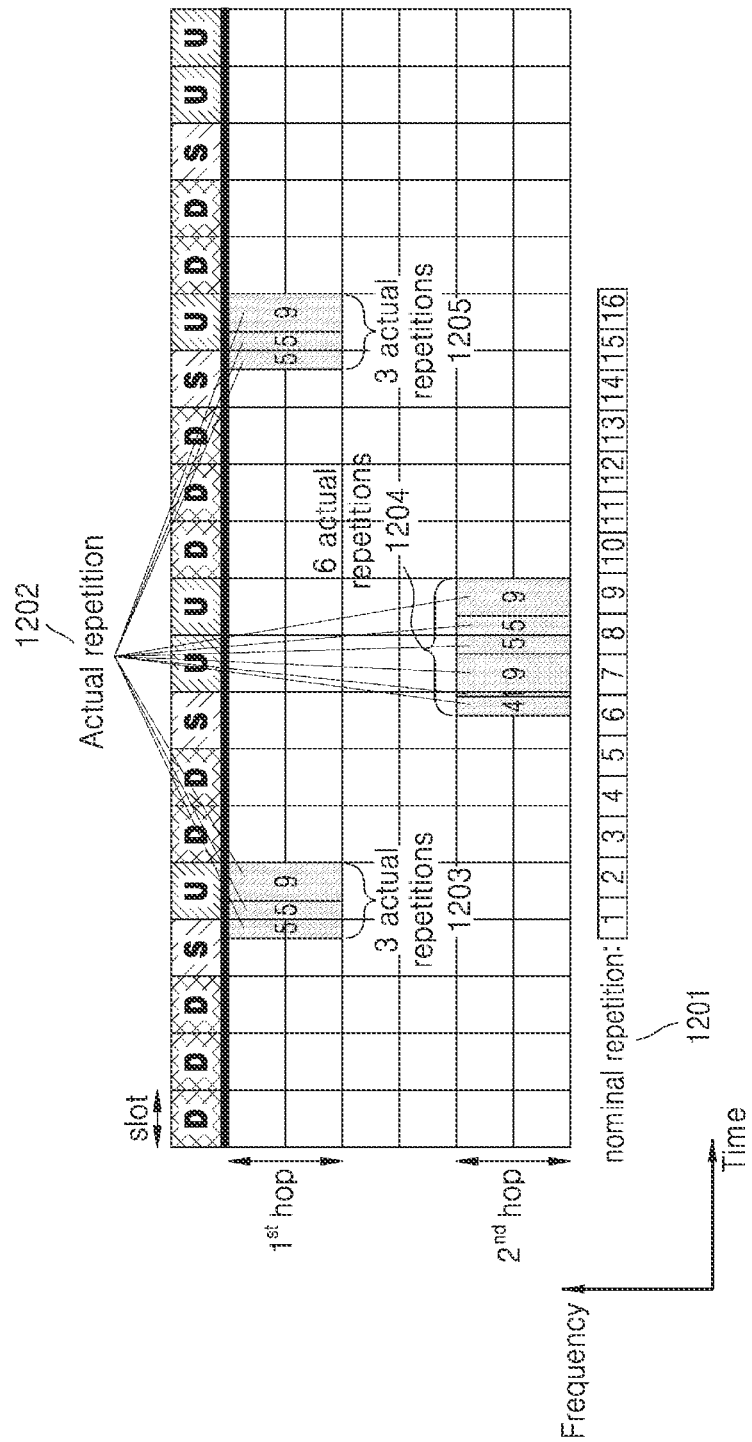
FIG. 12 illustrates a frequency hopping method as another example in a PUSCH repetitive transmission type B, according to an embodiment of the disclosure.

FIG. 12 illustrates a frequency hopping method as another example in a PUSCH repetitive transmission type B, according to an embodiment of the disclosure. Referring to FIG. 12, when the UE is configured with start symbol S of a UL data channel as '9', length L of the UL data channel as '10', and the number of repetitive transmissions as '16', 16 successive nominal repetitions each having 10 OFDM symbols may be performed (1201).

The UE may then determine a symbol set to a DL symbol in each nominal repetition as an invalid symbol in determining invalid symbols. When there are one or more successive valid symbols in a slot other than the invalid symbol(s) in each nominal repetition, the valid symbols may be configured for actual repetitions and a total of 12 actual repetitions may be transmitted (1202).

When the UE is configured with an interval pattern for frequency hopping to be 3 actual repetitions and 6 actual repetitions, the UE may transmit the first three of the actual repetitions configured for repetitive transmission in a first hop (1103), next six actual repetitions in a second hop (1104), and repeatedly next three actual repetitions back in the first hop (1105). Resources determined as valid symbols in the configured hops may be set to actual repetitions and transmitted.

[Method 2]

Frequency hopping may be performed by making the start symbol/slot and periodicity of UL-DL TDD configuration settings in the TDD system be the same as the start symbol/slot and periodicity of the frequency hopping pattern. Basically, successive UL resources may be determined in slots/symbols according to the UL-DL TDD configuration settings. Accordingly, by making the start symbol/slot and periodicity of the UL-DL TDD configuration settings be the same as the start symbol/slot and periodicity of the frequency hopping pattern, successive UL resources in the UL-DL TDD configuration settings may be transmitted in the same frequency hop.

Figure 13:
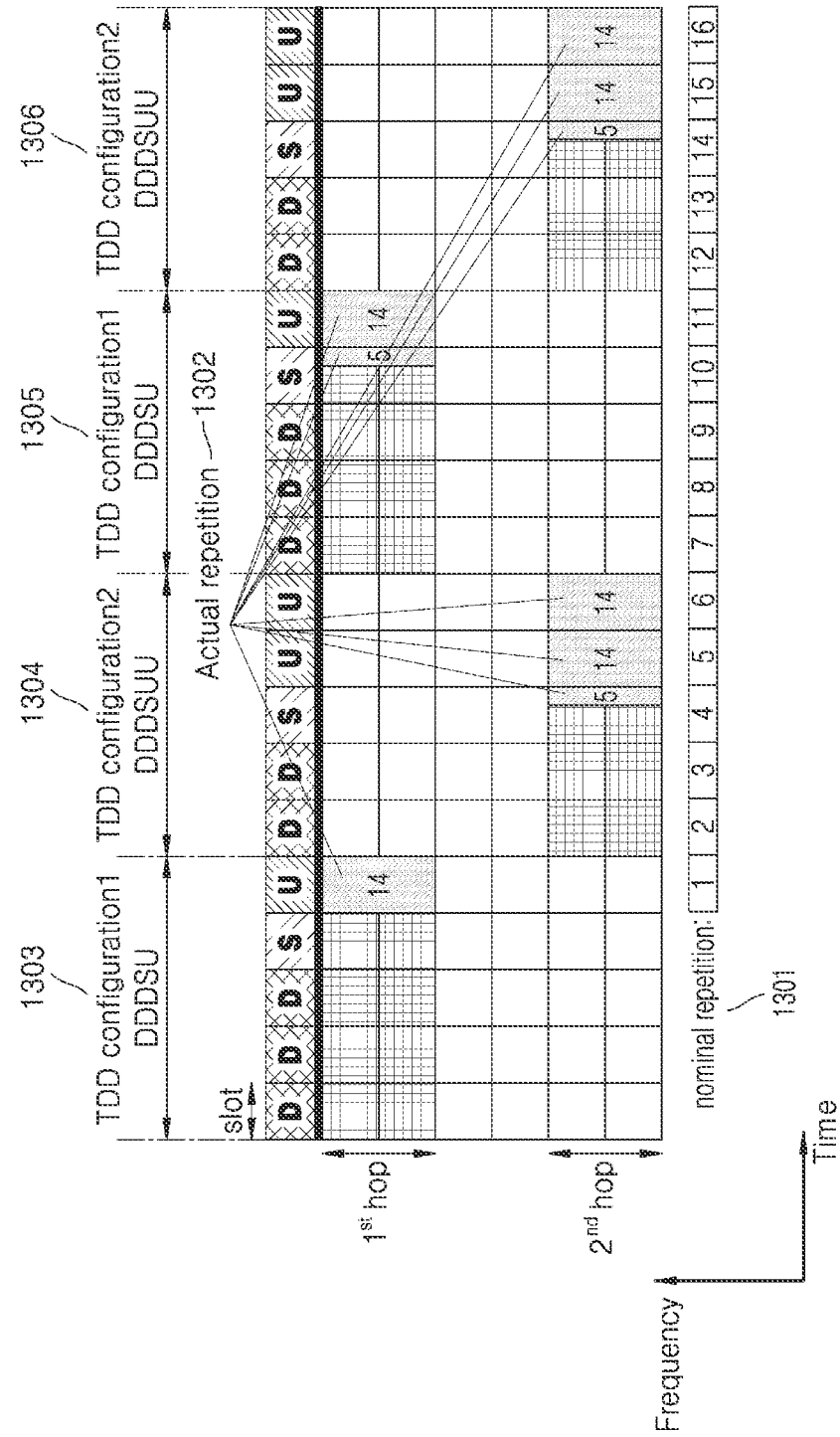
FIG. 13 illustrates a frequency hopping method as another example in a PUSCH repetitive transmission type B, according to an embodiment of the disclosure.

FIG. 13 illustrates a frequency hopping method as another example in a PUSCH repetitive transmission type B, according to an embodiment of the disclosure. Referring to FIG. 13, when the UE is configured with start symbol S of a UL data channel as '0', length L of the UL data channel as '14', and the number of repetitive transmissions as '16', nominal repetitions may be performed in 16 successive slots (1301).

The UE may then determine a symbol set to a DL symbol in each nominal repetition as an invalid symbol in determining invalid symbols. When there are one or more successive valid symbols in a slot other than the invalid symbol(s) in each nominal repetition, the valid symbols may be configured for actual repetitions and a total of 9 actual repetitions may be transmitted (1302).

When the UE is configured with a frequency hopping pattern to have the same start symbol/slot and periodicity with the UL-DL TDD configuration, TDD configuration 1 is set to DDDSU (1303), and TDD configuration 2 is set to DDSUU (1304), the start symbol/slot and periodicity of a first hop of the frequency hopping may be the same as in the symbol/slot in which TDD configuration 1 is configured, and the start symbol/slot and periodicity of a second hop may be set to the same as in the symbol/slot in which TDD configuration 2 is configured. Likewise, symbols/slots configured for the next TDD configuration 1 may be configured to be transmitted in the first hop, and symbols/slots configured for TDD configuration 2 may be configured to be transmitted in the second hop.

Resources determined as valid symbols in the configured hops may be set to actual repetitions and transmitted. This may be equally applied to the PUSCH repetitive transmission type A. The method proposed in the method 2 is described with the cell-specific UL-DL TDD configuration, but is not limited thereto and may also be used based on a slot format indicator (SFI) that may be configured in DCI or UE-specific UL-DL TDD configuration.

[Method 3]

The UE may perform frequency hopping for each of successive PUSCH transmissions in the time domain. In the case that frequency hopping is performed for each of the successive PUSCH transmissions, the UE and the BS may transmit and receive a PUSCH by performing frequency hopping without additional frequency hopping pattern information.

Specifically, when two PDSCHs have a gap smaller than particular N symbols in the time domain, it may be determined as successive PUSCH transmissions. The particular N symbols may be determined based on a minimum gap condition allowing a channel to be estimated by simultaneously using DMRSs transmitted in a plurality of PUSCHs. When PUSCH transmission is performed by two actual repetitions, the UE may calculate the number of symbols between the two PUSCH transmissions, and keep the hop of the frequency hopping the same when the number of the symbols is smaller than N and change the hop of the frequency hopping when the number of the symbols is larger.

Figure 14:
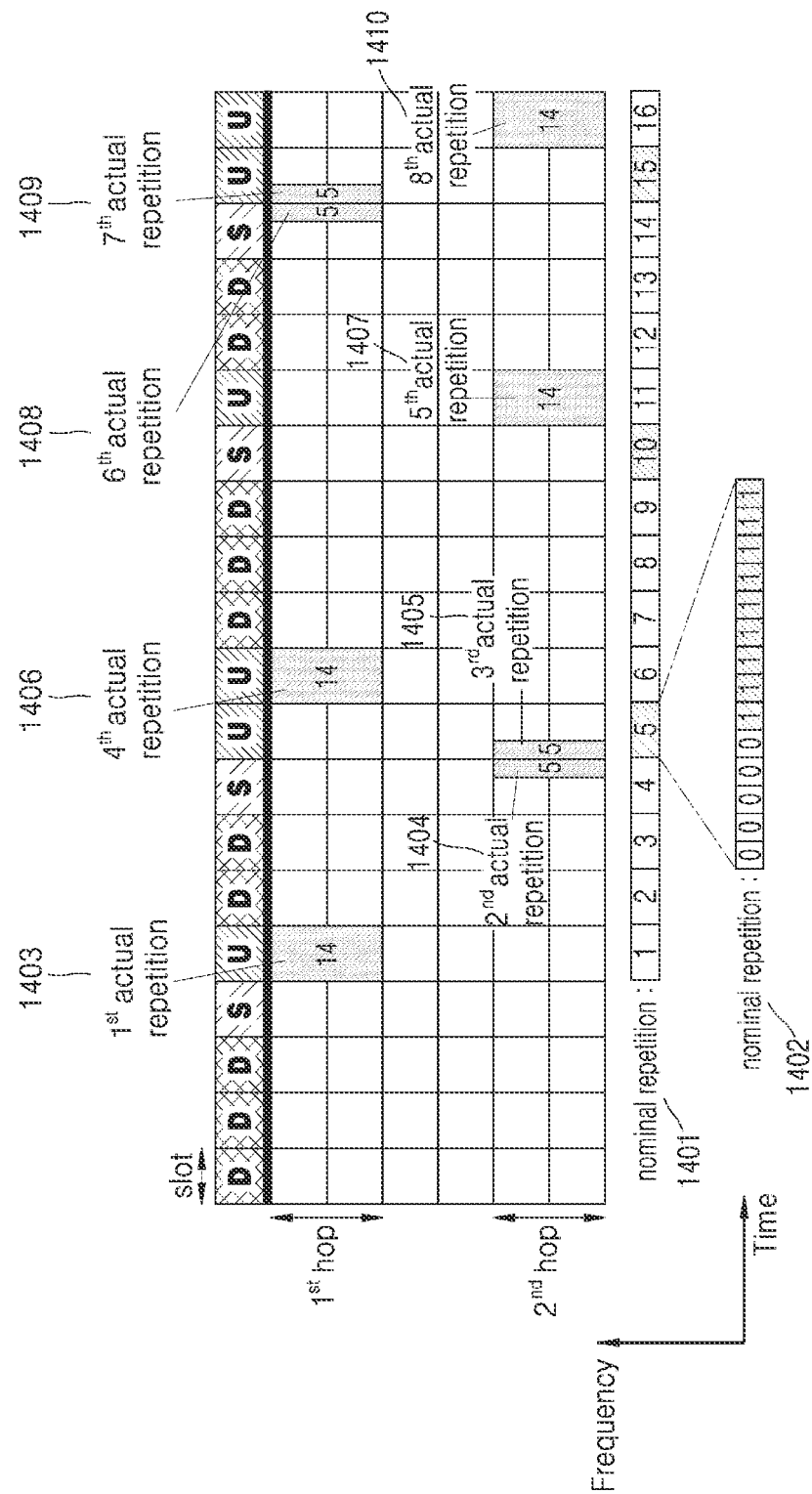
FIG. 14 illustrates a frequency hopping method as another example in a PUSCH repetitive transmission type B, according to an embodiment of the disclosure.

FIG. 14 illustrates a frequency hopping method as another example in a PUSCH repetitive transmission type B, according to an embodiment of the disclosure. Referring to FIG. 14, when the UE is configured with start symbol S of a UL data channel as '0', length L of the UL data channel as '14', and the number of repetitive transmissions as '16', nominal repetitions may be performed in 16 successive slots (1401).

To determine invalid symbols, the UE may then determine a symbol set to a DL symbol in each nominal repetition as an invalid symbol, and determine symbols set to 1 in an invalid symbol pattern (1402) as invalid symbols. When there are one or more successive valid symbols in a slot other than the invalid symbol(s) in each nominal repetition, it may be configured and transmitted as actual repetitions 1403, 1404, 1405, 1406, 1407, 1408, 1409 and 1410.

Assuming that an OFDM symbol gap with which no hop switching is required in frequency hopping between PUSCH transmissions corresponds to 7 symbols, the PUSCH may be transmitted in a first hop for a first actual repetition 1403, and for a second actual repetition 1404, there is hop switching and the PUSCH may be transmitted in a second hop because the second actual repetition 1404 is 37 symbols away in the time domain from the first actual repetition 1403, so the gap between the PUSCHs has more than 7 symbols. For a third actual repetition 1405, the PUSCH may be transmitted in the second hop because there is no symbol gap with the second actual repetition 1404 in the time domain. For a fourth actual repetition 1406, there is hop switching and the PUSCH may be transmitted in the first hop because the fourth actual repetition 1406 is 9 symbols away from the third actual repetition 1405 in the time domain, which exceeds the gap of 7 symbols between PUSCHs. Similarly, fifth, sixth, seventh and eighth actual repetitions 1407, 1408, 1409 and 1410 may also undergo hop switching for frequency hopping based on symbol gaps between PUSCHs and then be transmitted.

[Method 4]

The BS may configure a bitmap for determining hops for frequency hopping for the UE to perform frequency hopping. Although the BS has high overhead for directly configuring the UE with the bitmap for frequency hopping, it may flexibly configure proper frequency hopping on any occasion through the bitmap configuration. When the bitmap for determining a hop for frequency hopping has '0', it indicates a first hop, and when the bitmap has '1', it indicates a second hop. In another method, when the bitmap represents '0', it may indicate that transmission is to be performed without hop switching, and when the bitmap represents '1', it may indicate that transmission is to be performed by changing the existing hop to another hop. In this case, a unit indicated by one bit in the bitmap may be determined in the following methods:

[Method 4-1]

A unit indicated by one bit in the bitmap for frequency hopping may be configured in slots. In the case that a bit in the bitmap is configured in slots, the UE may transmit a PUSCH by performing frequency hopping without additional determination after receiving the bitmap for frequency hopping.

Assuming that '0' in the bitmap for determining a hop for frequency hopping indicates a first hop, and '1' in the bitmap indicates a second hop, the bitmap in FIG. 10 may be represented in a total of 16 bits: 0001111100011111. In this case, in FIG. 10, the first three slots may be transmitted in the first hop (1003) and next five slots may be transmitted in the second hop (1004), and repeatedly, next three slots may be transmitted back in the first hop (1005) and next five slots may be transmitted back in the second hop (1006).

In addition, assuming that '0' in the bitmap for determining a hop for frequency hopping indicates that transmission is to be performed without hop switching, and '1' in the bitmap indicates that transmission is to be performed by changing the existing hop to another hop, the bitmap in FIG. 10 may be represented in a total of 16 bits: 0001000010010000. Resources determined as valid symbols in the configured hops may be set to actual repetitions and transmitted. The method 4-1 may be equally applied to the PUSCH repetitive transmission type A.

[Method 4-2]

A unit indicated by one bit in the bitmap for frequency hopping may be configured in nominal repetitions. In the case that bits in the bitmap are configured in nominal repetitions, the UE may transmit a PUSCH by determining what actual repetition is included in the nominal repetition and performing frequency hopping after receiving the bitmap for frequency hopping.

Assuming that '0' in the bitmap for determining a hop for frequency hopping indicates a first hop, and '1' in the bitmap indicates a second hop, the bitmap in FIG. 11 may be represented in a total of 16 bits: 0000011111100000. In this case, on the occasion of FIG. 11, actual repetitions included in the first five of the nominal repetitions configured for repetitive transmission may be transmitted in the first hop (1103), actual repetitions included in the next six nominal repetitions may be transmitted in the second hop (1104), and repeatedly actual repetitions included in the next five nominal repetitions may be transmitted back in the first hop (1105).

In addition, assuming that '0' in the bitmap for determining a hop for frequency hopping indicates that transmission is to be performed without hop switching, and '1' in the bitmap indicates that transmission is to be performed by changing the existing hop to another hop, the bitmap in FIG. 11 may be represented in a total of 16 bits: 0000010000010000. Resources determined as valid symbols in the configured hops may be set to actual repetitions and transmitted.

[Method 4-3]

A unit indicated by a bit in the bitmap for frequency hopping may be configured in actual repetitions. In the case that bits in the bitmap is configured in actual repetitions, the UE may transmit a PUSCH by determining what actual repetition is included in the nominal repetition and performing frequency hopping after receiving the bitmap for frequency hopping.

Assuming that '0' in the bitmap for determining a hop for frequency hopping indicates a first hop, and '1' in the bitmap indicates a second hop, the bitmap on the occasion of FIG. 12 may be represented in a total of 12 bits: 000111111000. In this case, first three of the actual repetitions configured for repetitive transmission in FIG. 12 may be transmitted in the first hop (1203), next six actual repetitions may be transmitted in the second hop (1204), and repeatedly, next three actual repetitions may be transmitted back in the first hop (1205).

In addition, assuming that '0' in the bitmap for determining a hop for frequency hopping indicates that transmission is to be performed without hop switching, and '1' in the bitmap indicates that transmission is to be performed by changing the existing hop to another hop, the bitmap in FIG. 12 may be represented in a total of 12 bits: 000100000100. Accordingly, resources determined as valid symbols in the configured hops may be set to actual repetitions and transmitted.

Second Embodiment

The second embodiment of the disclosure is directed to a method of changing an OFDM symbol position of a DMRS when channel estimation is possible by simultaneously using DMRSs transmitted in a plurality of PUSCHs. In the case that channel estimation is possible by simultaneously using DMRSs transmitted in a plurality of PUSCHs, OFDM symbol positions of the DMRSs may be inefficiently arranged. In the case of the PUSCH repetitive transmission type B in particular, the number of symbols for an actual repetition is not fixed, the OFDM symbol positions of the DRMSs may be configured in series as they always have a front-loaded DMRS configuration, ending with inefficient arrangement of the OFDM symbols of the DMRSs in channel estimation. With the method of changing OFDM symbol positions of DMRSs as described in the embodiment, channel estimation performance based on the same number of DMRS OFDM symbols may be improved, or low channel encoding rates attained by reducing the number of DMRS OFDM symbols may improve decoding performance.

Specifically, for PUSCH transmission, in such a case as the front-loaded DMRS configuration, the DMRS needs to be transmitted in the first OFDM symbol of the PUSCH configured as described above. In this case, in the foremost PUSCH in successive PUSCH repetitive transmissions with the front-loaded DMRS configuration, an additional DMRS may be configured in the last symbol or near the last symbol in time. As the subsequent PUSCH transmission also has the front-loaded DMRS configuration, a DMRS is configured in a symbol right behind the DMRS configured in the last symbol of the previous PUSCH. Accordingly, when it is possible to estimate a channel by simultaneously using DMRSs transmitted from a plurality of PUSCHs, the channel estimation may be made more efficiently by changing OFDM symbol positions of the DMRSs such that the OFDM symbol positions of the DMRSs are arranged more uniformly.

In the disclosure, as a method of changing the OFFDM symbol positions of the DMRSs in consideration of a method of estimating a channel by simultaneously using DMRSs transmitted in the plurality of PUSCHs, the following methods are proposed:

[Method 1]

When it is possible to estimate a channel by simultaneously using DMRSs transmitted in a plurality of PUSCHs, OFDM symbol positions of the DMRSs may be configured by changing the existing PUSCH mapping type into a new PUSCH mapping type. In a PUSCH mapping type A, the start symbol of the PUSCH is always fixed to the first symbol of a slot, and in a PUSCH mapping type B, the DMRS is always fixed to the first symbol of the PUSCH. Accordingly, as the PUSCH may not be transmitted in the first symbol of the slot in such a case as the PUSCH repetitive transmission type B, it is always fixed to the PUSCH mapping type B, causing the OFDM symbols of the DMRSs to be configured to be located inefficiently as described above.

To solve this, a new PUSCH mapping type may be configured in which the DMRS is not allocated in the first symbol of the PUSCH as in the PUSCH mapping type A and a resource allocated to the PUSCH as in the PUSCH mapping type B may be performed anywhere in the slot. When the restriction that the PUSCH needs to be configured from the first symbol of the slot in the PUSCH mapping type A is lifted, the restriction for the DMRS position to be determined based on the first symbol of the slot may also be lifted. Accordingly, a channel may be estimated by simultaneously using DMRSs transmitted in a plurality of PUSCHs, and in the case of the PUSCH repetitive transmission type B, the PUSCH may be configured in the new PUSCH mapping type.

Figure 15:
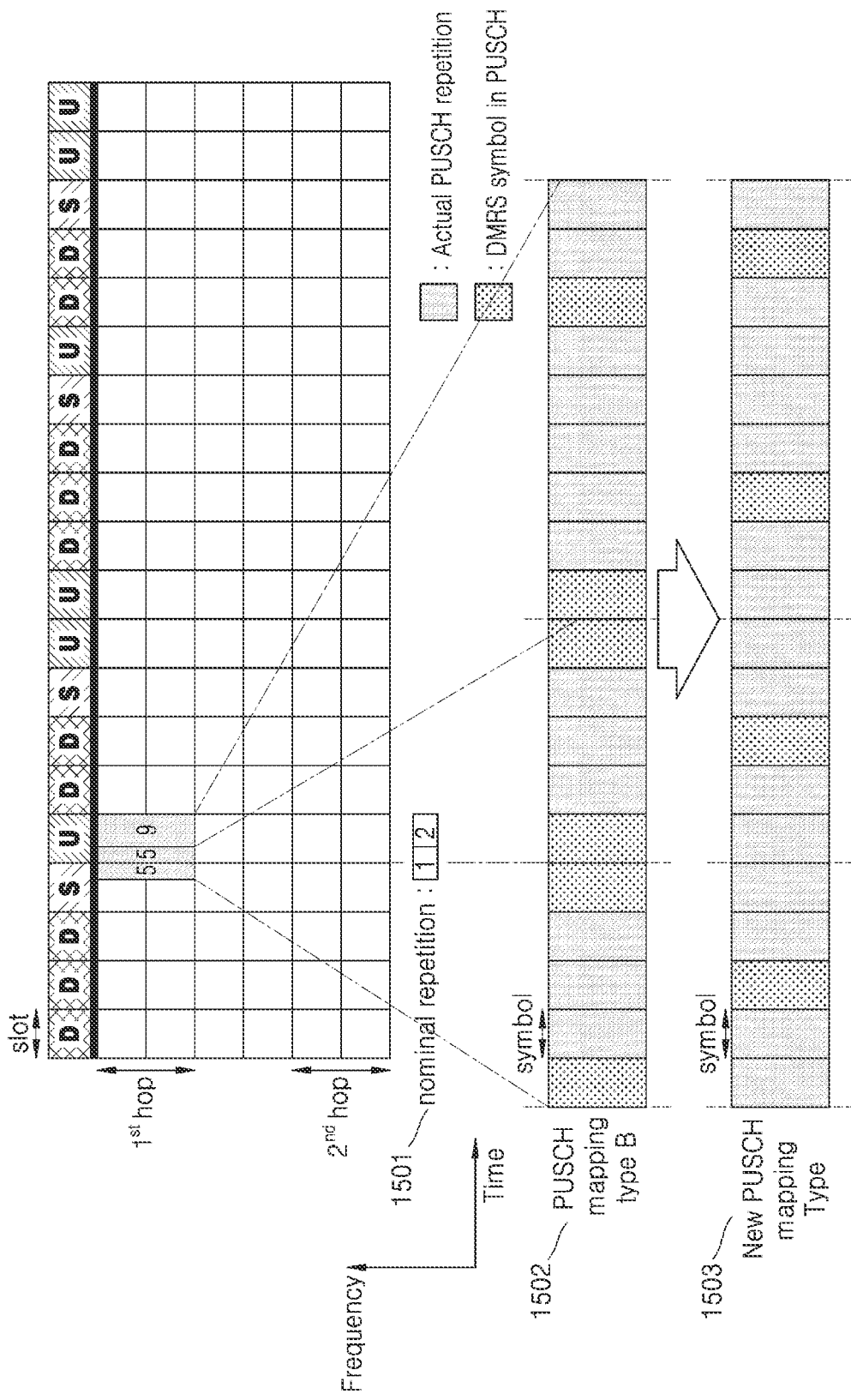
FIG. 15 illustrates a DMRS location switching method in a PUSCH repetitive transmission type B, according to an embodiment of the disclosure.

FIG. 15 illustrates a DMRS location switching method in a PUSCH repetitive transmission type B, according to an embodiment of the disclosure. Referring to FIG. 15, when the UE is configured with start symbol S of a UL data channel as '9', length L of the UL data channel as '10', and the number of repetitive transmissions as '2', 2 successive nominal repetitions each having 10 OFDM symbols may be performed (1501).

The UE may transmit the PUSCHs in 3 actual repetitions after determining invalid symbols. In this case, for the first three successive PUSCHs, an OFDM symbol of the DMRS may be located in the first symbol of each PUSCH, and as for the PUSCH having 5 symbols, a DMRS may be located in the last symbol (1502). As in the aforementioned method, considering a new PUSCH mapping type in which the DMRS is not allocated in the first symbol of the PUSCH as in the PUSCH mapping type A and a resource allocated to the PUSCH as in the PUSCH mapping type B may be performed anywhere in the slot, there is no restriction that needs to be configured from the first symbol of the slot in the PUSCH mapping type A, and the DMRS position may not be restricted to be determined based on the first symbol of the slot. In this case, in the three successive PUSCHs, DMRSs may be transmitted in a third symbol, an eighth symbol, a thirteenth symbol, and an eighteenth symbol (1503). This may enable the PUSCH to be transmitted at a lower channel coding rate without a big difference in channel estimation performance from the existing transmission of 6 DMRS OFDM symbols.

[Method 2]

OFDM symbol positions of DMRSs may be configured by considering successive actual repetition PUSCHs as a single nominal repetition PUSCH. Such inefficient DMRS symbol positioning as described above may occur when successive PUSCHs having a small number of symbols are configured. Accordingly, when a nominal repetition is divided into two actual repetitions by a slot boundary, DMRS OFDM symbols may be configured by considering PUSCHs in the two actual repetitions as a PUSCH in a single nominal repetition instead of configuring DMRS OFDM symbols of the respective PUSCHs in the two actual repetitions.

Figure 16:
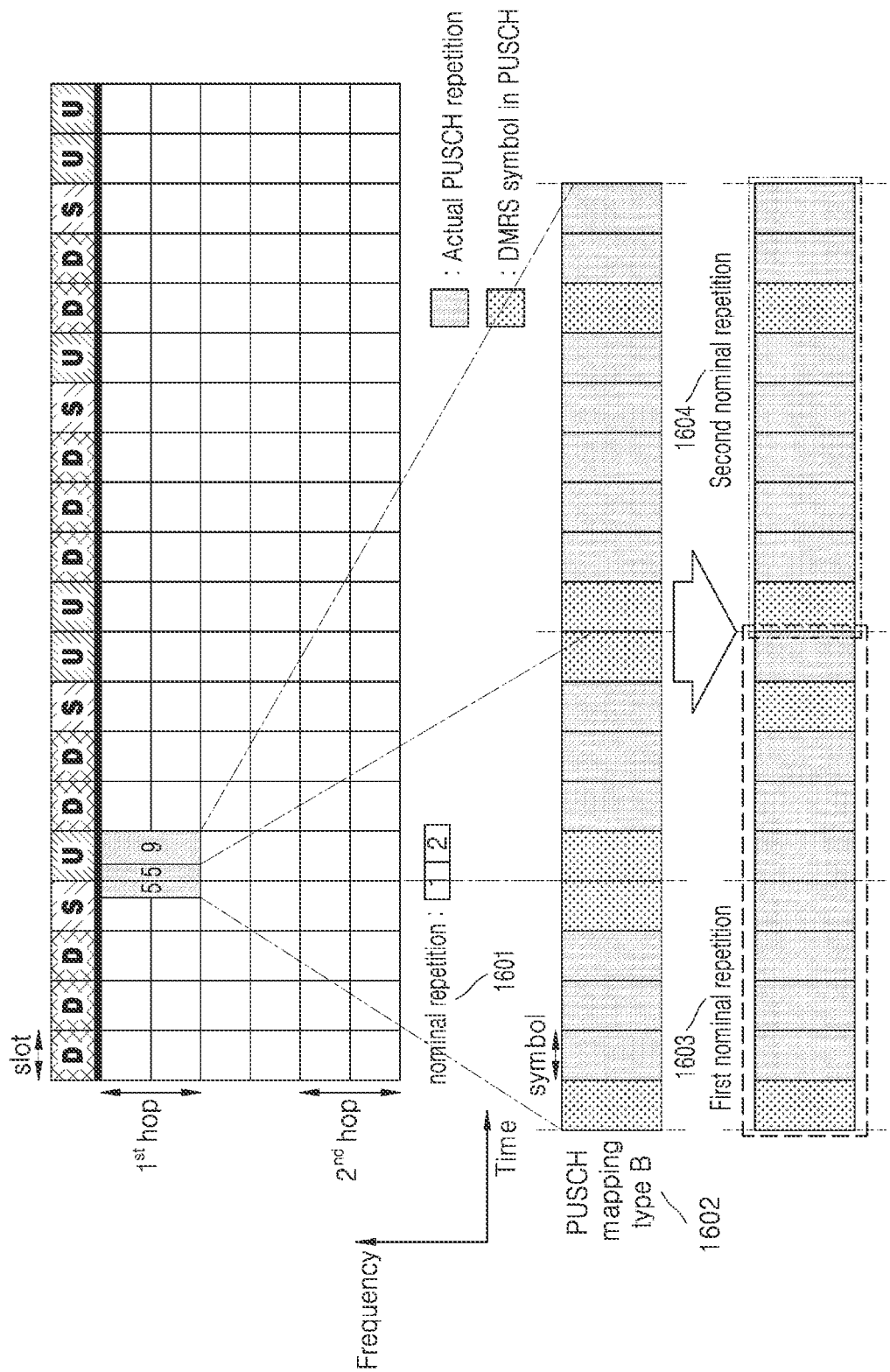
FIG. 16 illustrates another DMRS location switching method in a PUSCH repetitive transmission type B, according to an embodiment of the disclosure.

FIG. 16 illustrates another DMRS location switching method in a PUSCH repetitive transmission type B, according to an embodiment of the disclosure. Referring to FIG. 16, when the UE is configured with start symbol S of a UL data channel as '9', length L of the UL data channel as '10', and the number of repetitive transmissions as '2', 2 successive nominal repetitions each having 10 OFDM symbols may appear (1501).

The UE may transmit the PUSCHs in 3 actual repetitions after determining invalid symbols. In this case, for the first three successive PUSCHs, an OFDM symbol of the DMRS may be located in the first symbol of each PUSCH, and as for the PUSCH having 5 symbols, a DMRS may be located in the last symbol (1602). When the DMRS OFDM symbol position is configured by considering PUSCHs in the nominal repetition as a single PUSCH as in the aforementioned method, two actual repetition PUSCHs each having 5 symbols may be regarded as a single PUSCH having 10 symbols in the first nominal repetition. Accordingly, DMRS OFDM symbol positions for the single PUSCH having 10 symbols may be configured at first and ninth symbols (1603). For the second nominal repetition having a single actual repetition with 9 symbols, DMRSs may be transmitted in the first and seventh OFDM symbols as they are. This may enable the PUSCH to be transmitted at a lower channel coding rate without a big difference in channel estimation performance from the existing transmission of 6 DMRS OFDM symbols.

Figure 17:
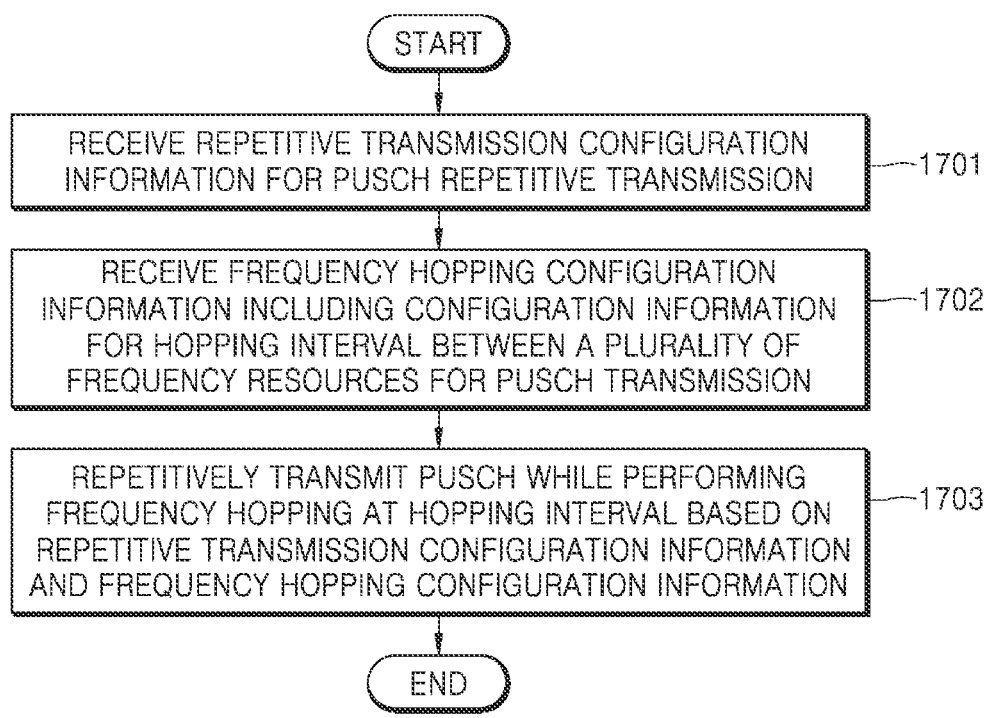
FIG. 17 is a flowchart illustrating a UE operation method, according to an embodiment of the disclosure.

FIG. 17 is a flowchart illustrating a UE operation method, according to an embodiment of the disclosure.

In operation 1701, the UE may receive repetitive transmission configuration information for PUSCH repetitive transmission from the BS.

In an embodiment, the repetitive transmission configuration information may include information about the number of repetitive transmissions of the PUSCH and information about time resources in which to repetitively transmit the PUSCH. The information about the time resources in which to repetitively transmit the PUSCH may include time resource allocation information for the PUSCH. The time resource allocation information for the PUSCH may include a location of the start symbol of the PUSCH, a time length of the PUSCH, and information about a PUSCH mapping type. The PUSCH mapping type may include PUSCH mapping type A, B, or a new PUSCH mapping type. The new PUSCH mapping type may be a PUSCH mapping type according to the method 1 in the embodiment 2. Alternatively, the time resource allocation information for the PUSCH may include configuration information for a DMRS OFDM symbol location of the PUSCH. For example, the time resource allocation information for the PUSCH may include information about a DMRS OFDM symbol location configured according to the method 2 in the embodiment 2.

According to an embodiment, the information about the time resources in which to repetitively transmit the PUSCH may include information about a PUSCH repetitive transmission type. The PUSCH repetitive transmission type may include a PUSCH repetitive transmission type A, a PUSCH repetitive transmission type B, etc. When the PUSCH repetitive transmission type is set to B, the repetitive transmission configuration information may be information about the PUSCH repetitive transmission type B, including information about a time resource configured for the PUSCH to be repetitively transmitted n times depending on the number of repetitive transmissions, information about invalid symbols, etc. The information about the PUSCH repetitive transmission type B was described earlier in detail, so the description thereof will not be repeated.

In an embodiment, the repetitive transmission configuration information may be received from the BS through higher layer signaling (e.g., RRC signaling) or L1 signaling (e.g., DCI).

In operation 1702, the UE may receive, from the BS, frequency hopping configuration information including configuration information for a hopping interval between a plurality of frequency resources for transmitting the PUSCH. The operation 1720 may correspond to operations 701 and 702 of FIGS. 7, 801 and 802 of FIGS. 8 and 901 and 902 of FIG. 9.

In an embodiment, the frequency hopping configuration information may include information indicating frequency hopping to be performed for repetitive transmissions.

According to an embodiment, the frequency hopping configuration information may include information about a plurality of frequency resources (i.e., two or more frequency resources) in which frequency hopping is performed. The information about the plurality of frequency resources may include information about a frequency band of the plurality of frequencies, information about a frequency interval (or frequency offset) between a plurality of frequency resources, etc. Furthermore, the frequency hopping configuration information may include information about an order in which frequency hopping is performed.

In an embodiment, the frequency hopping configuration information may include configuration information for a hopping interval between a plurality of frequency resources. The configuration information for the hopping interval may correspond to the aforementioned interval pattern, and include information about a time interval at which frequency hopping is performed between the plurality of frequency resources.

In an embodiment, the hopping interval may be configured on a slot basis. In this case, the slot-based hopping interval may be configured according to the aforementioned method 1-1 in the first embodiment. In another embodiment, the hopping interval may be configured based on a transmission unit configured for the PUSCH to be transmitted according to the number of repetitive transmissions. In this case, the hopping interval based on the transmission unit configured for the PUSCH to be transmitted according to the number of repetitive transmissions may be configured according to the aforementioned method 1-2 in the first embodiment. In another embodiment, the hopping interval may be configured based on transmission units in which the PUSCH is actually and repeatedly transmitted, which are determined according to the information about invalid symbols. In this case, the hopping interval based on the transmission units in which the PUSCH is actually and repeatedly transmitted may be configured according to the aforementioned method 1-3 in the first embodiment. In another embodiment, the hopping interval may be configured based on a time division duplex (TDD) UL-DL configuration. In this case, the hopping interval based on the TDD UL-DL configuration may be configured according to the aforementioned method 2.

In an embodiment, the configuration information for a hopping interval may include information about a reference of time interval at which frequency hopping is performed. For example, based on the time interval reference, the UE may not perform frequency hopping when a time interval (i.e., a symbol length) between two PUSCHs is smaller than the time interval reference, and perform frequency hopping when a time interval is greater than the time interval reference. The time interval reference for performing frequency hopping may correspond to a reference for determining successive PUSCH transmissions of the aforementioned method 3 in the first embodiment.

In an embodiment, the frequency hopping configuration information may include information about a bitmap to determine a frequency hopping interval. In this case, the bitmap to determine the frequency hopping interval may be configured according to the aforementioned method 4 in the first embodiment.

In an embodiment, the frequency hopping configuration information may correspond to the number of repetitive transmissions, and the UE may receive the frequency hopping configuration information from the BS in every repetitive transmission. Furthermore, the UE may determine frequency hopping configuration information corresponding to the information about the number of repetitive transmissions received from the BS in operation 1710. Alternatively, the UE may receive a plurality of pieces of frequency hopping configuration information from the BS, and may determine frequency hopping configuration information to be used for frequency hopping among the plurality of pieces of frequency hopping configuration information by receiving information indicating the one of the plurality of pieces of frequency hopping configuration information.

In an embodiment, the frequency hopping configuration information may be received from the BS through higher layer signaling (e.g., RRC signaling) or L1 signaling (e.g., DCI).

In operation 1703, the UE may repetitively transmit the PUSCH to the BS while performing frequency hopping at the hopping interval based on the repetitive transmission configuration information and the frequency hopping configuration information.

In an embodiment, the UE may determine frequency resources and time resources in which to repetitively transmit the PUSCH according to the repetitive transmission configuration information and the frequency hopping configuration information. Furthermore, the UE may determine a hopping interval for performing frequency hopping according to the frequency hopping configuration information. The UE may repetitively transmit the PUSCH to the BS while performing frequency hopping based on the frequency resources, the time resources, and the hopping interval for PUSCH repetitive transmission.

In an embodiment, the UE may repetitively transmit the PUSCH including DMRSs to which the same precoding is applied. The UE may receive configuration information about applying the same precoding to the DMRSs from the BS, and repetitively transmit the PUSCH by applying the same precoding to the DMRSs based on the configuration.

Figure 18:
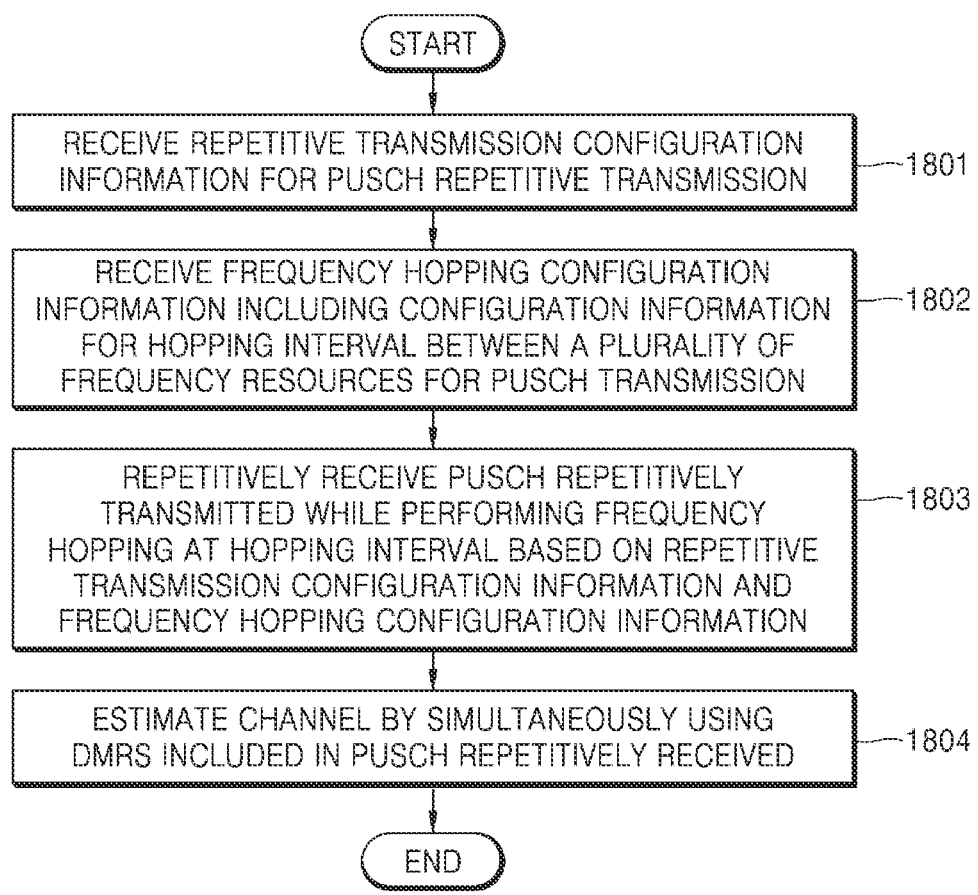
FIG. 18 is a flowchart illustrating a BS operation method, according to an embodiment of the disclosure.

FIG. 18 is a flowchart illustrating a BS operation method, according to an embodiment of the disclosure. FIG. 18 illustrates a BS operation method corresponding to the UE operation method of FIG. 17. Descriptions of FIG. 18 overlapping with FIG. 17 will not be repeated.

In operation 1801, the BS may transmit repetitive transmission configuration information for PUSCH repetitive transmission to the UE.

In operation 1802, the BS may transmit, to the UE, frequency hopping configuration information including configuration information for a hopping interval between a plurality of frequency resources for transmitting the PUSCH.

In operation 1803, the BS may repetitively receive, from the UE, the PUSCH repetitively transmitted while performing frequency hopping at the hopping interval based on the repetitive transmission configuration information and the frequency hopping configuration information.

In operation 1804, the BS may estimate a channel by simultaneously using at least one of the DMRSs included in the PUSCHs repetitively received.

In an embodiment, the BS may determine DMRSs to be used to perform channel estimation. For example, the BS may determine PUSCHs received by using the same frequency resources within a certain time interval, among the PUSCHs repetitively received. The BS may determine DMRSs included in the determined PUSCHs as the DMRSs to be used to perform channel estimation. The BS may perform channel estimation by simultaneously using the determined DMRSs. In this case, the certain time interval may be determined based on a minimum time interval allowing channel estimation to be performed by simultaneously using the plurality of DMRSs.

In an embodiment, the BS may transmit, to the UE, information configuring repetitive transmission through the PUSCH by applying the same precoding to the DMRSs. The configuration information for precoding may be transmitted in one of the aforementioned operations. The BS may repetitively receive, from the UE, the PUSCH including the DMRSs to which the same precoding is applied, and estimate a channel by simultaneously using the DMRSs to which the same precoding is applied.

Figure 19:
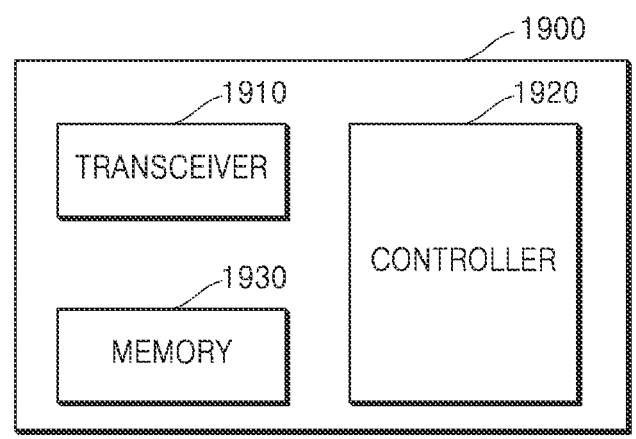
FIG. 19 is a block diagram of a UE, according to an embodiment of the disclosure.

FIG. 19 is a block diagram of a UE, according to an embodiment of the disclosure.

Referring to FIG. 19, a UE 1900 may include a transceiver 1910, a controller 1920, and a storage 1930. The transceiver 1910, the controller 1920, and the storage 1930 of the UE 1900 may operate according to a method of efficiently transmitting or receiving a channel and signal in the 5G communication system as described above in connection with the previous embodiments. The elements of the UE 1900 is not, however, limited thereto. For example, the UE 1900 may include more or fewer elements than described above. In addition, in a special occasion, the transceiver 1910, the controller 1920, and the storage 1930 may be implemented in the form of a single chip.

The transceiver 1910 may include a transmitter and a receiver in another embodiment. The transceiver 1910 may transmit or receive signals to or from a BS. The signals may include control information and data. For this, the transceiver 1910 may include an RF transmitter for up-converting the frequency of a signal to be transmitted and amplifying the signal and an RF receiver for low-noise amplifying a received signal and down-converting the frequency of the received signal. In addition, the transceiver 1910 may receive a signal on a wireless channel and output the signal to the controller 1920, or transmit a signal output from the controller 1920 on a wireless channel.

The controller 1920 may control a series of processes for the UE 1900 to be operated according to the embodiments of the disclosure. For example, the controller 1920 may perform at least one of a method of changing OFDM symbol positions of DMRSs and a method of performing frequency hopping in consideration of a method of estimating a channel by simultaneously using DMRSs transmitted in a plurality of PUSCHs according to embodiments of the disclosure. For this, the controller 1920 may include at least one processor. For example, the controller 1920 may include a communication processor (CP) for controlling communication and an application processor (AP) for controlling a higher layer such as an application program.

The storage 1930 may store control information or data such as frequency hopping information, information relating to channel estimation simultaneously using DMRSs transmitted in a plurality of PUSCHs, etc., included in a signal obtained by the UE 1900, and have sectors for storing data required for control of the controller 1920 and data that occurs during the control in the controller 1920.

Figure 20:
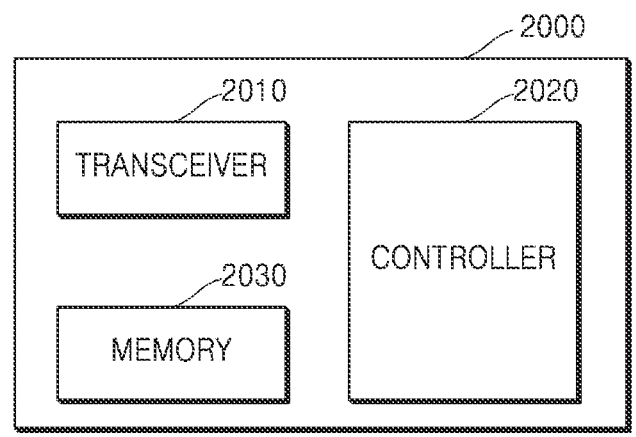
FIG. 20 is a block diagram of a BS, according to an embodiment of the disclosure.

FIG. 20 is a block diagram of a BS, according to an embodiment.

Referring to FIG. 20, a BS 2000 may include a transceiver 2010, a controller 2020, and a storage 2030. The transceiver 2010, the controller 2020, and the storage 2030 of the BS 2000 may operate according to a method of efficiently transmitting or receiving a channel and signal in the 5G communication system as described above in connection with the previous embodiments. The elements of the BS 2000 is not, however, limited thereto. In another embodiment, the BS 2000 may include more or fewer elements than described above. In addition, in a special occasion, the transceiver 2010, the controller 2020, and the storage 2030 may be implemented in the form of a single chip.

The transceiver 2010 may include a transmitter and a receiver in another embodiment. The transceiver 2010 may transmit or receive signals to or from a UE. The signals may include control information and data. For this, the transceiver 2010 may include an RF transmitter for up-converting the frequency of a signal to be transmitted and amplifying the signal and an RF receiver for low-noise amplifying a received signal and down-converting the frequency of the received signal. In addition, the transceiver 2010 may receive a signal on a wireless channel and output the signal to the controller 2020, or transmit a signal output from the controller 2020 on a wireless channel.

The controller 2020 may control a series of processes for the BS 2000 to be operated according to the embodiments of the disclosure. For example, the controller 2020 may perform at least one of a method of changing OFDM symbol positions of DMRSs and a method of performing frequency hopping in consideration of a method of estimating a channel by simultaneously using DMRSs transmitted in a plurality of PUSCHs according to embodiments of the disclosure. For this, the controller 2020 may include at least one processor. For example, the controller 2020 may include a CP for controlling communication and an AP for controlling a higher layer such as an application program.

The storage 2030 may store control information or data such as frequency hopping information, information relating to channel estimation simultaneously using DMRSs transmitted in a plurality of PUSCHs, etc., determined by the BS 2000, and control information or data received from the UE, and have sectors for storing data required for control of the controller 2020 and data that occurs during the control in the controller 2020.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments may be operated by being combined with one another if necessary.

The invention claimed is:

1. A method of a user equipment (UE) for performing frequency hopping for a physical uplink shared channel (PUSCH) repetition, the method comprising:
receiving frequency hopping interval information via higher layer signaling, wherein the frequency hopping interval information indicates a number of slots for PUSCH frequency hopping;
receiving resource allocation information via downlink control information (DCI), wherein the resource allocation information indicates a number of PUSCH repetitions; and
performing frequency hopping for the PUSCH repetition based on the number of PUSCH repetitions and the frequency hopping interval information,
wherein in case that at least one symbol of symbols indicated by the resource allocation information in a slot is a downlink symbol, the slot is not included in slots corresponding to the number of PUSCH repetitions.

2. The method of claim 1, wherein the downlink symbol is indicated by a time division duplex uplink downlink (TDD UL-DL) configuration.

3. A method of a base station for performing frequency hopping for a physical uplink shared channel (PUSCH) repetition, the method comprising:
- transmitting, to a user equipment (UE), frequency hopping interval via higher layer signaling, wherein the frequency hopping interval information indicates a number of slots for PUSCH frequency hopping;
- transmitting, to the UE, resource allocation information via downlink control information (DCI), wherein the resource allocation information indicates a number of PUSCH repetitions; and
- performing frequency hopping for the PUSCH repetition based on the number of PUSCH repetitions and the frequency hopping interval information,
- wherein in case that at least one symbol of symbols indicated by the resource allocation information in a slot is a downlink symbol, the slot is not included in slots corresponding to the number of PUSCH repetitions.

4. A user equipment (UE) for performing frequency hopping for a physical uplink shared channel (PUSCH) repetition, the UE comprising:
- a transceiver; and
- at least one processor coupled to the transceiver, wherein the at least one processor is configured to:
  - receive frequency hopping interval information via higher layer signaling, wherein the frequency hopping interval information indicates a number of slots for PUSCH frequency hopping,
  - receive resource allocation information via downlink control information (DCI), wherein the resource allocation information indicates a number of PUSCH repetitions, and
  - perform frequency hopping for the PUSCH repetition based on the number of PUSCH repetitions and the frequency hopping interval information,
  - wherein in case that at least one symbol of symbols indicated by the resource allocation information in a slot is a downlink symbol, the slot is not included in slots corresponding to the number of PUSCH repetitions.

5. A base station for performing frequency hopping for a physical uplink shared channel (PUSCH) repetition, the base station comprising:
- a transceiver; and
- at least one processor coupled to the transceiver, wherein the at least one processor is configured to:
  - transmit, to a user equipment (UE), frequency hopping interval information via higher layer signaling, wherein the frequency hopping interval information indicates a number of slots for PUSCH frequency hopping,
  - transmit, to the UE, resource allocation information via downlink control information (DCI), wherein the resource allocation information indicates a number of PUSCH repetitions, and
  - perform frequency hopping for the PUSCH repetition based on the number of PUSCH repetitions and the frequency hopping interval information,
  - wherein in case that at least one symbol of symbols indicated by the resource allocation information in a slot is a downlink symbol, the slot is not included in slots corresponding to the number of PUSCH repetitions.

6. The base station of claim 5, wherein the DCI includes frequency hopping indication information indicating whether to perform frequency hopping.

7. The base station of claim 5, wherein the higher layer signaling includes radio resource control (RRC) signaling.

8. The method of claim 1, wherein the resource allocation information includes a time domain resource assignment field of the DCI, and wherein the resource allocation information further indicates a start symbol of a PUSCH, a time length of the PUSCH, and a PUSCH mapping type.

9. The method of claim 1, wherein the DCI includes frequency hopping indication information indicating whether to perform frequency hopping.

10. The method of claim 1, wherein the higher layer signaling includes radio resource control (RRC) signaling.

11. The method of claim 1, wherein performing frequency hopping for the PUSCH repetition includes:
- identifying a frequency hop in a slot for the PUSCH repetition, based on the frequency hopping interval information; and
- transmitting a PUSCH using the identified frequency hop in the slot for the PUSCH repetition.

12. The method of claim 1, wherein the slots for PUSCH frequency hopping are configured to be consecutive.

13. The method of claim 3, wherein the resource allocation information includes a time domain resource assignment field of the DCI, and wherein the resource allocation information further indicates a start symbol of a PUSCH, a time length of the PUSCH, and a PUSCH mapping type.

14. The method of claim 3, wherein the DCI includes frequency hopping indication information indicating whether to perform frequency hopping.

15. The method of claim 3, wherein the higher layer signaling includes radio resource control (RRC) signaling.

16. The method of claim 3, wherein performing frequency hopping for the PUSCH repetition includes:
- identifying a frequency hop in a slot for the PUSCH repetition, based on the frequency hopping interval information; and
- transmitting a PUSCH using the identified frequency hop in the slot for the PUSCH repetition.

17. The method of claim 3, wherein the slots for PUSCH frequency hopping are configured to be consecutive.

18. The method of claim 3, wherein the downlink symbol is indicated by a time division duplex uplink downlink (TDD UL-DL) configuration.

19. The UE of claim 4, wherein the DCI includes frequency hopping indication information indicating whether to perform frequency hopping.

20. The UE of claim 4, wherein the higher layer signaling includes radio resource control (RRC) signaling.

* * * * *